United States Patent
Knight et al.

(10) Patent No.: US 7,983,915 B2
(45) Date of Patent: Jul. 19, 2011

(54) AUDIO CONTENT SEARCH ENGINE

(75) Inventors: Michael J. Knight, Pittsburgh, PA (US);
Jonathan Scott, Pittsburgh, PA (US);
Steven J. Yurick, South Park, PA (US);
John Hancock, Pittsburgh, PA (US)

(73) Assignee: Sonic Foundry, Inc., Madison, WI (US)

( * ) Notice: Subject to any disclaimer, the term of this patent is extended or adjusted under 35 U.S.C. 154(b) by 1114 days.

(21) Appl. No.: 11/742,137

(22) Filed: Apr. 30, 2007

(65) Prior Publication Data

US 2008/0270138 A1   Oct. 30, 2008

(51) Int. Cl.
*G10L 15/04* (2006.01)
*G10L 11/00* (2006.01)
*G06F 17/30* (2006.01)

(52) U.S. Cl. .................. 704/254; 704/270; 707/706

(58) Field of Classification Search .................. None
See application file for complete search history.

(56) References Cited

U.S. PATENT DOCUMENTS

| | | | |
|---|---|---|---|
| 6,243,713 B1 | 6/2001 | Nelson et al. | |
| 6,374,260 B1 | 4/2002 | Hoffert et al. | |
| 6,507,838 B1 | 1/2003 | Syeda-Mahmood | |
| 6,578,040 B1 | 6/2003 | Syeda-Mahmood | |
| 6,859,803 B2 | 2/2005 | Dagtas et al. | |
| 6,873,993 B2 * | 3/2005 | Charlesworth et al. | 707/740 |
| 6,877,002 B2 | 4/2005 | Prince | |
| 6,944,611 B2 | 9/2005 | Flank et al. | |
| 6,968,366 B1 | 11/2005 | Zhang et al. | |
| 6,990,448 B2 | 1/2006 | Charlesworth et al. | |
| 7,054,812 B2 | 5/2006 | Charlesworth et al. | |
| 7,092,870 B1 * | 8/2006 | Chen et al. | 704/9 |
| 7,257,533 B2 * | 8/2007 | Charlesworth et al. | 704/249 |
| 7,310,600 B1 * | 12/2007 | Garner et al. | 704/234 |
| 7,467,087 B1 * | 12/2008 | Gillick et al. | 704/260 |
| 7,590,605 B2 * | 9/2009 | Josifovski | 706/29 |
| 7,610,306 B2 * | 10/2009 | Lin et al. | 1/1 |
| 7,725,319 B2 * | 5/2010 | Aronowitz | 704/253 |
| 2002/0107847 A1 | 8/2002 | Johnson | |
| 2003/0177108 A1 | 9/2003 | Charlesworth et al. | |
| 2004/0267774 A1 | 12/2004 | Lin et al. | |
| 2005/0262073 A1 | 11/2005 | Reed et al. | |
| 2006/0206324 A1 * | 9/2006 | Skilling et al. | 704/231 |
| 2007/0106685 A1 | 5/2007 | Houh et al. | |
| 2008/0071542 A1 * | 3/2008 | Yu | 704/270 |
| 2008/0086453 A1 | 4/2008 | Fabian | |
| 2008/0162125 A1 * | 7/2008 | Ma et al. | 704/222 |
| 2009/0083033 A1 * | 3/2009 | Cardillo et al. | 704/246 |
| 2010/0121642 A1 * | 5/2010 | Hori et al. | 704/254 |

OTHER PUBLICATIONS

Non-final Office Action received for U.S. Appl. No. 11/742,124 dated Apr. 15, 2010.
Final Office Action received for U.S. Appl. No. 11/742,125 dated Oct. 13, 2010.

* cited by examiner

*Primary Examiner* — Brian L Albertalli
(74) *Attorney, Agent, or Firm* — Foley & Lardner LLP

(57) ABSTRACT

A method of generating an audio content index for use by a search engine includes determining a phoneme sequence based on recognized speech from an audio content time segment. The method also includes identifying k-phonemes which occur within the phoneme sequence. The identified k-phonemes are stored within a data structure such that the identified k-phonemes are capable of being compared with k-phonemes from a search query.

53 Claims, 15 Drawing Sheets

| Phoneme: | F | OW | M | S | OW | F | AX |
|---|---|---|---|---|---|---|---|
| Location Value: | 0 | 1 | 2 | 3 | 4 | 5 | 6 |
| Identification Number: | 0 | 1 | 2 | 3 | 1 | 0 | 4 |

Fig. 3A

| Possible Order Independent Bi-phonemes | Mapping Location Obtained from the Ordinal Function | Starting Location of the Bi-phoneme within the Phoneme Sequence |
|---|---|---|
| F-OW or OW-F | 0 | 0, 4 |
| M-F or F-M | 1 | (null) |
| M-OW or OW-M | 2 | 1 |
| S-F or F-S | 3 | (null) |
| S-OW or OW-S | 4 | 3 |
| S-M or M-S | 5 | 2 |
| AX-F or F-AX | 6 | 5 |
| AX-OW or OW-AX | 7 | (null) |
| AX-M or M-AX | 8 | (null) |
| AX-S or S-AX | 9 | (null) |

Fig. 3B

Education System:

1) EH-JH-AX-K-EY-SH-AX-N    S-IH-S-T-AX-M
2) EH-JH-Y-U-K-EY-SH-AX-N    S-IH-S-T-AX-M

| Bi-phonemes: | EH-JH, JH-AX, AX-K, K-EY, SH-AX, AX-N, JH-Y, Y-U, U-K, S-IH, S-T, T-AX, AX-M |
|---|---|
| Tri-phonemes: | EH-JH-AX, JH-AX-K, AX-K-EY, K-EY-SH, EY-SH-AX, SH-AX-N, EH-JH-Y, JH-Y-U, Y-U-K, U-K-EY, S-IH-T, IH-S-T, S-T-AX, T-AX-M |

| Audio Content Search Result: | Time of Occurrence (ms): | Assigned Score: |
|---|---|---|
| the | 50 | 0 |
| quick | 100, 300 | 0, -1 |
| brown | 0, 200 | 0, 0 |
| fox | 350 | 0 |

Fig. 8

Audio Content Search Results Set

| Ranking: | Rich Media Presentation: | Borda Count Points: |
|---|---|---|
| 1 | A | 5 |
| 2 | C | 4 |
| 3 | B | 3 |

Fig. 12A

Video Content Search Results Set

| Ranking: | Rich Media Presentation: | Borda Count Points: |
|---|---|---|
| 1 | B | 5 |
| 2 | D | 4 |

Fig. 12B

Textual Content Search Results Set

| Ranking: | Rich Media Presentation: | Borda Count Points: |
|---|---|---|
| 1 | B | 5 |
| 2 | C | 4 |
| 3 | E | 3 |
| 4 | | 2 |
| 5 | A | 1 |

| Audio Content Search Results Set | |
|---|---|
| Presentation: | No. of Results (Confidence Score): |
| A | 25 (99), 2 (30) |
| C | 3 (99), 7 (60), 4 (20) |
| B | 1 (99) |

Fig. 13B

| Video Content Search Results Set | |
|---|---|
| Presentation: | No. of Results (Quality Score): |
| B | 20 (100), 5 (50) |
| D | 10 (100) |

Fig. 13C

| Textual Content Search Results Set | |
|---|---|
| Presentation: | No. of Results (Quality Score): |
| D | 30 (100) |
| B | 20 (100), 12 (75), 6 (50) |
| C | 20 (100), 12 (75), 3 (50) |
| E | 2 (100) |

AUDIO CONTENT SEARCH ENGINE

FIELD

The subject of the disclosure relates generally to searching of rich media content. More specifically, the disclosure relates to an audio content search system, method, and computer-readable medium which uses a phonetic matching and scoring algorithm to produce audio content search results.

BACKGROUND

With the recent emergence of rich media creation tools, rich media content is being created and archived at a rapid pace. Rich media content can generally refer to a time synchronized ensemble of audio content and/or visual (text, images, graphics, video, etc.) content which is captured from a presentation, lecture, speech, debate, television broadcast, board meeting, video, etc. Metadata content may also be associated with the rich media content. Each of the audio content, visual content, and metadata content types can contain valuable information which may be unique to that content type. For example, a slide presented during a presentation may contain information that was not verbally referred to by the presenter. As a result, locating relevant information within rich media content requires the ability to efficiently analyze and search each type of the rich media content.

Unfortunately, traditional rich media content search engines are unable to effectively implement multi-type (or multi-modal) searching. In most cases, rich media search engines are only capable of searching through a single rich media content type. For example, some rich media search engines utilize a single textual content search engine to search for relevant information within rich media content. The textual content search engine can be used to search through rich media content metadata such as content title, content date, content presenter, etc. Other rich media content search engines utilize a single audio content search engine to locate relevant information. Audio content search engines generally use automatic speech recognition (ASR) to analyze and index audio content such that the audio content can be searched using a standard text-based search engine. These single mode search engines are limited by their inability to locate relevant information in more than a single rich media content type.

More recent rich content search engines have attempted to combine aspects of textual metadata content search engines, audio content search engines, and/or visual content search techniques to improve rich media content searching. However, these search engines are limited in their ability to effectively combine the search results obtained from the different search engines. In addition, audio content search engines are unable to produce reliable search results. Current audio content search techniques utilize either ASR or phonetic matching to generate an audio content transcript which is capable of being searched by a standard textual content search engine.

Automatic speech recognition typically uses a pre-determined vocabulary of words and attempts to identify words within the audio content in order to obtain an audio content transcript. Audio content transcripts generated by ASR are limited because the ASR vocabulary used may not include proper names, uncommon words, and industry-specific terms. The ASR audio content transcripts often contain errors due to a speaker's pronunciation variance, voice fluctuation, articulation, and/or accent. Error rates are usually higher when the ASR system has not been specifically trained for a particular speaker. In many instances, pre-training of a speaker is simply not possible or practical and therefore the ASR system is required to perform speaker-independent recognition. In addition, variances in recording characteristics and environmental noise also increase the likelihood of errors in an ASR system.

Phonetic matching can refer to a technique for locating occurrences of a search phrase within audio content by comparing sub-word units of sound called phonemes. Phonetic matching has several advantages over ASR, including the ability to compensate for spelling mistakes in a search query, the ability to find words which are not in a pre-defined vocabulary, and greater flexibility in finding partial matches between the search query and the audio content. However, as with ASR, results may contain errors due to speaker pronunciation variances and other factors. Thus, there exist many cases where, used alone, neither ASR nor phonetic matching is capable of producing accurate and reliable audio content search results. Current audio content search engines are further limited by their inability to effectively take advantage of other synchronized content types of rich media content such as visual content which is presented in temporal proximity to spoken words.

Thus, there is a need for a multi-type rich media content search system which effectively combines the results of a visual content search, an audio content search, and a textual metadata content search. Further, there is a need for an audio content search system which utilizes both automatic speech recognition and phonetic matching to enhance the accuracy and reliability of audio content search results. Further, there is a need for an audio content search system which utilizes correlated, time-stamped textual content to enhance the accuracy of audio content search results.

SUMMARY

An exemplary method of generating an audio content index for use by a search engine includes determining a phoneme sequence based on recognized speech from an audio content time segment. The method also includes identifying k-phonemes which occur within the phoneme sequence. The identified k-phonemes are stored within a data structure such that the identified k-phonemes are capable of being compared with k-phonemes from a search query.

An exemplary method of locating information within an audio content time segment includes identifying k-phonemes of a search query based on a phonetic pronunciation of the search query. The method also includes identifying k-phonemes within an audio content index which match the identified k-phonemes of the search query to determine an audio content index starting location, wherein the audio content index comprises phoneme data associated with an audio content time segment. A comparison of the phonetic pronunciation to the phoneme data is performed at the audio content index starting location to identify an audio content search result.

An exemplary system for locating information within an audio content time segment includes an audio content search application, a memory, and a processor. The audio content search application includes computer code configured to identify k-phonemes of a search query based on a phonetic pronunciation of the search query. The computer code is also configured to identify k-phonemes within an audio content index which match the identified k-phonemes of the search query to determine an audio content index starting location. The audio content index includes phoneme data associated with an audio content time segment. The computer code is also configured to perform a comparison of the phonetic pronunciation to the phoneme data at the audio content index starting location to identify an audio content search result. The memory is configured to store the audio content search application. The processor is coupled to the memory and configured to execute the audio content search application.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

FIG. 3A is a table illustrating a location value and an identification number for each phoneme in the phrase "FOAM SOFA" in accordance with an exemplary embodiment.

FIG. 3B is a table illustrating a mapping location and starting location for each order independent bi-phoneme in the phrase 'FOAM SOFA' in accordance with an exemplary embodiment.

FIG. 8 is a table illustrating audio content search results obtained from a comparison of the search query "THE QUICK BROWN FOX" to an audio content index in accordance with an exemplary embodiment.

FIG. 12A is a table illustrating Borda Count points assigned to a ranked audio content search results set in accordance with an exemplary embodiment.

FIG. 12B is a table illustrating Borda Count points assigned to a ranked visual content search results set in accordance with an exemplary embodiment.

FIG. 12C is a table illustrating Borda Count points assigned to a ranked textual metadata content search results set in accordance with an exemplary embodiment.

FIG. 13A is a table illustrating an audio content search results set along with confidence scores for the valid sequences within each individual audio content search result in accordance with an exemplary embodiment.

FIG. 13B is a table illustrating a visual content search results set along with quality scores of visual content search results within each individual visual content search result in accordance with an exemplary embodiment.

FIG. 13C is a table illustrating a textual metadata content search results set along with quality scores of textual metadata content search results within each individual textual metadata content search result in accordance with an exemplary embodiment.

DETAILED DESCRIPTION

Figure 1:
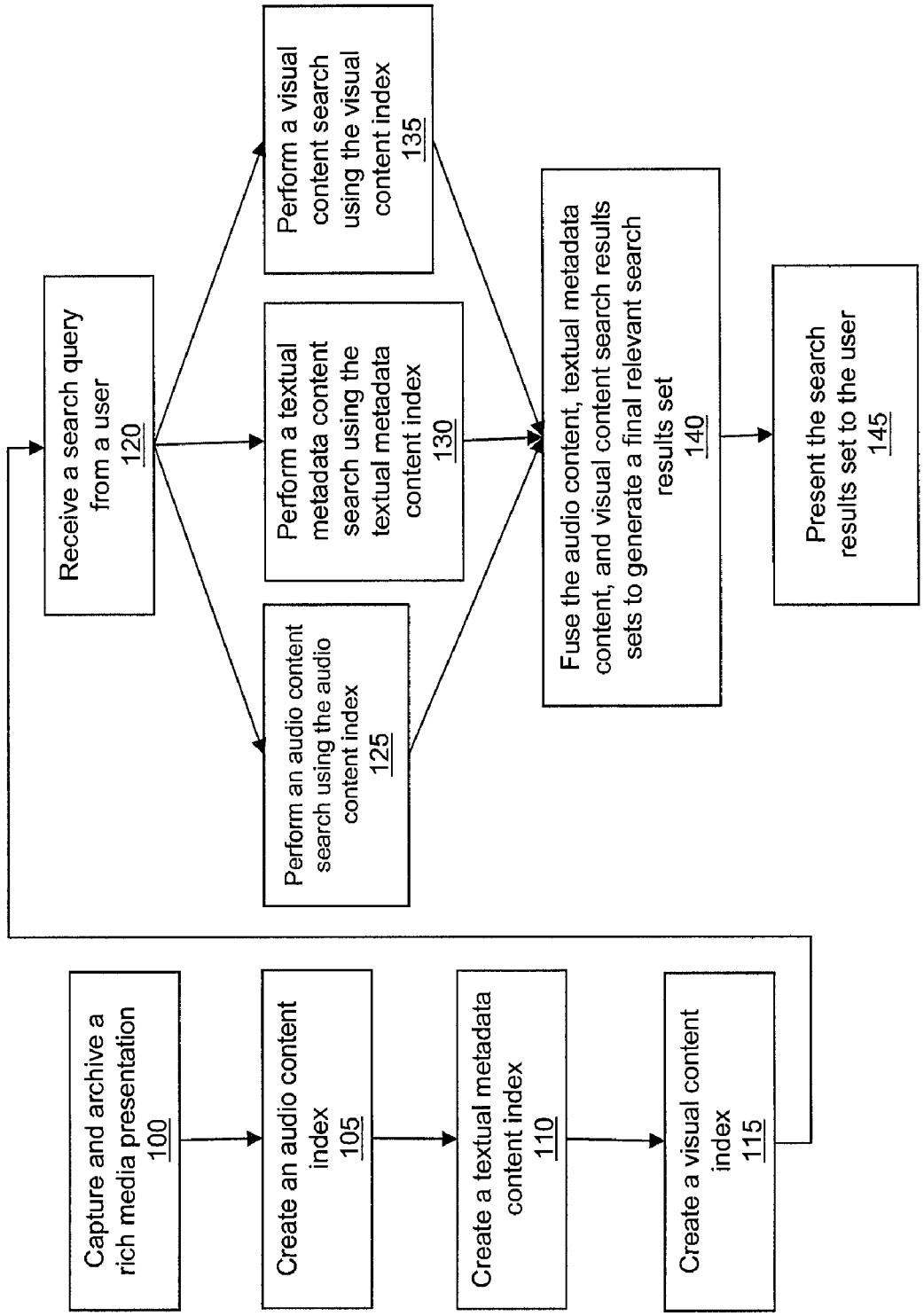
FIG. 1 is a flow diagram illustrating an overview of operations performed by a rich media content search system in accordance with an exemplary embodiment.
Figure 14:
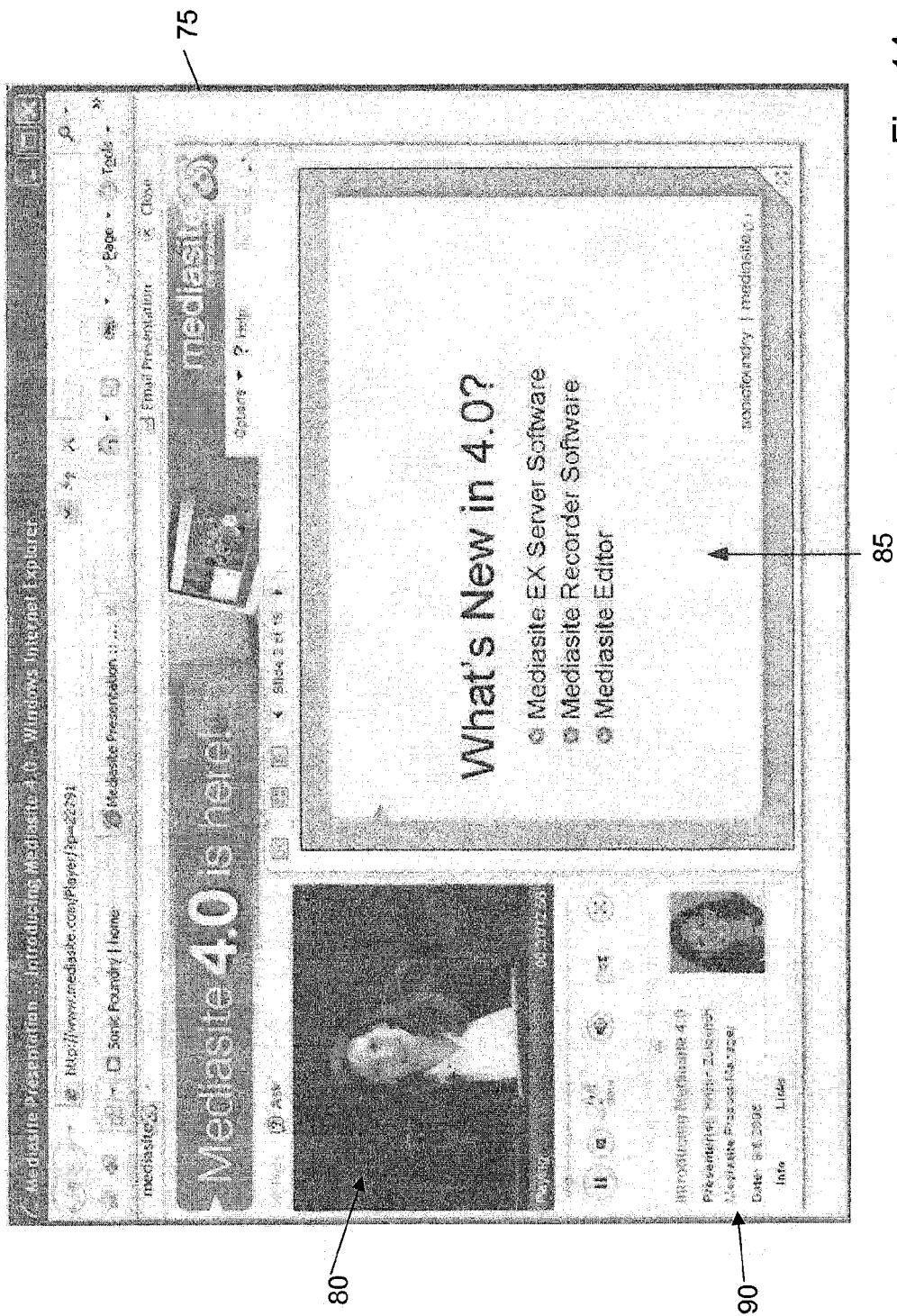
FIG. 14 is a rich media presentation in accordance with an exemplary embodiment.

FIG. 1 is a flow diagram illustrating an overview of operations performed by a rich media content search system in accordance with an exemplary embodiment. Additional, fewer, or alternative operations may be performed in alternative embodiments. In an exemplary embodiment, the rich media content search system (or system) can refer to an aggregate search system composed of any or all of the components, operations, processes, algorithms, and engines described herein. In an operation 100, a rich media presentation is captured and archived. A rich media presentation can refer to any rich media event (including presentations, speeches, lectures, videos, meetings, etc.) which includes textual metadata content, visual content, and/or audio content. An exemplary rich media presentation 75 is illustrated with reference to FIG. 14. Rich media presentation 75 includes audio and visual content 80 in the form of a presenter and her voice. Rich media presentation 75 also includes visual content 85 in the form of a slideshow used by the presenter during her presentation. Rich media presentation 75 also includes textual metadata content 90 regarding rich media presentation 75 and the presenter.

In an exemplary embodiment, a rich media time segment can refer to the duration of time of an entire rich media presentation or a portion of time within a rich media presentation. A portion of a rich media presentation may be a logical portion such as a chapter of a rich media presentation, a subchapter of a rich media presentation, a topic within a rich media presentation, a timeframe in which a particular presenter was speaking, a timeframe in which a presentation slide was displayed, a timeframe in which a word or phrase was spoken, etc. Content types can include textual metadata content, visual content, and audio content.

Metadata can refer to data about data. Textual metadata content can refer to any text-based information that is associated with rich media content. Text-based information can include a presenter's name, a title of the rich media presentation, a title of a chapter within the rich media presentation, a date upon which the rich media presentation was captured, an abstract or description of the rich media presentation, notes or annotations created by viewers of the rich media presentation, or any other data or metadata associated with the rich media presentation. Visual content can refer to any visible elements shown during the playback of a rich media presentation. Visible elements can include text, graphics, images, and/or video. Audio content can refer to any sound heard during the playback of the rich media presentation such as a presenter's voice, questions asked by audience members, audio associated with a captured video clip, a song, etc. In an exemplary embodiment, the rich media presentation can be captured using any rich media content capture tool known to those of skill in the art. Similarly, the rich media presentation can be archived according to any method known those of skill in the art.

In an operation 105, an audio content index is created by the system. In an exemplary embodiment, the system can create the audio content index using automatic speech recognition (ASR) in conjunction with time-stamped, correlated text and a phonetic data matching algorithm. Correlated text can refer to text in one of the rich media content types which may be duplicated in another rich media content type. For example, text extracted from a presentation slide (visual content) may be spoken (audio content) by a presenter as he/she describes the slide. In one embodiment, a single audio content index can be used for all rich media presentations within an archive. Alternatively, the audio content index can include phonetic data and/or timestamps corresponding to the audio content in an audio content time segment. In an exemplary embodiment, an audio content time segment can refer to audio content from an entire rich media presentation, audio content from a chapter of a rich media presentation, audio content from a subchapter of a rich media presentation, audio content from a topic within a rich media presentation, audio content from a presenter that presented during a rich media presentation, etc. As a result, the audio content from a single rich media presentation can be represented within a plurality of audio content indices. The audio content index and its creation are described in more detail with reference to FIGS. 2-3.

In an operation 110, a textual metadata content index is created by the system. In an exemplary embodiment, the textual metadata content index can be in the form of an inverted index. The inverted index can include words which make up the textual metadata content and a relationship between the words and the rich media presentation. In another exemplary embodiment, the relationship can be an identification of how the words are associated with the rich media presentation (i.e., in the title, in an abstract, as an annotation, etc.). Alternatively, the textual metadata content index can be any other type of searchable index known to those of skill in the art. In one embodiment, a single textual metadata content index can be created for all rich media presentations in an archive. Alternatively, the system can create a single textual metadata content index for each rich media presentation. Alternatively, the system can create a textual metadata content index for each chapter, subchapter, topic, etc. of a rich media presentation such that a single rich media presentation can be represented within a plurality of textual metadata content indices. The textual metadata content index and its creation are described in more detail with reference to FIG. 10.

In an operation 115, a visual content index is created by the system. The visual content index can be based on words and/or any other textual content extracted from a video content modality through an extraction process such as optical character recognition (OCR). In an exemplary embodiment, the visual content index can be in the form of an inverted index similar to the textual metadata content index. The inverted index can include information identifying the extracted textual content, timestamp information for the extracted textual content, and/or any other information generated during the OCR extraction process. Alternatively, the visual content index can be any other type of searchable index known to those of skill in the art. In one embodiment, the system can create a single visual content index for all rich media presentations in a rich media archive. Alternatively, the system can create a single visual content index for each rich media presentation. Alternatively, the system can create a visual content index for each chapter, subchapter, topic, etc. of a rich media presentation such that a single rich media presentation can be represented within a plurality of visual content indices. In another alternative embodiment, multiple channels of content (audio or visual) corresponding to a single rich media presentation may be captured by the rich media capture tool. For example, a first visual content channel may be required to capture a presenter and blackboard and a second visual content channel may be required to capture a simultaneously used slide presentation. In such an embodiment, a distinct visual content index can be created for each distinct visual content channel. The visual content index and its creation are described in more detail with reference to FIG. 9.

In an operation 120, a search query is received from a user of the rich media content search system. The search query can be any type of query known to those of skill in the art. For example, the search query can be one or more words entered as text. The one or more words may include one or more conjunctions (and) to indicate that a returned search result should include each of a plurality of conjuncts, one or more alternatives (or) to indicate that the returned search result can include any of a plurality of words/phrases, quotation marks to indicate that the returned search result should include an exact phrase, and/or any other search commands or symbols known to those of skill in the art. In an exemplary embodiment, the user can also restrict the search by date, presenter name, presentation title, presentation abstract, presentation topic, number of returned search results, quality of returned search results, etc. In an alternative embodiment, the search query can be a verbalized search query. The system can analyze the verbalized search query and compare it to the rich media presentation using any of the language recognition, processing, and/or matching techniques described herein. In one embodiment, the system can perform a search query expansion on a received search query to identify synonyms and/or other words which are related to the search query. The synonyms and/or other words can be searched along with the words in the search query to provide more final search results and/or a better ranking of search results. As used herein, 'search query' can refer to the exact search query received from the user or an expanded search query including the additional synonyms and/or other related words.

In an operation 125, the rich media content search system performs an audio content search using the received search query and the audio content index. In an exemplary embodiment, the system can convert the search query into phonetic data to facilitate a comparison between the search query and the audio content index. Based on the comparison, the system can generate an audio content search results set. The system can also score and/or rank the individual audio content search results within the audio content search results set. In an exemplary embodiment, the system can also score audio content search results and/or valid sequences formed by the audio content search results. Generating and scoring the audio content search results set are described in more detail with reference to FIGS. 4-8.

In an operation 130, the rich media content search engine performs a textual metadata content search using the received search query and the textual content index. In an exemplary embodiment, the system can implement the textual metadata content search by comparing words/phrases from the search query to words/phrases within the textual metadata content associated with the rich media presentation. The comparison can be performed using any text matching or other technique known to those of skill in the art. Based on the comparison, the system can generate a textual metadata content search results set. The system can also score and/or rank individual textual metadata content search results within the textual metadata content search results set. In an exemplary embodiment, the system can also score textual metadata content search results within each individual textual metadata content search result. The generation and scoring of the textual metadata content search results set are described in more detail with reference to FIG. 10.

In an operation 135, the rich media content search system performs a visual content search using the received search query and the visual content index. In an exemplary embodiment, the system can implement the visual content search by comparing words/phrases from the search query with words/phrases from the visual content index. The comparison can be performed using any text matching or other technique known to those of skill in the art. In an exemplary embodiment, the comparison technique can be the same as the technique used to generate textual metadata content search results. Alternatively, a different technique can be used to generate the visual content search results. Based on the comparison, the system can generate a visual content search results set. The system can also score and/or rank the individual visual content search results within the visual content search results set. In an exemplary embodiment, the system can also score visual content search results in each individual visual content search result. Generation and scoring of the visual content search results set are described in more detail with reference to FIG. 9.

In an operation 140, the rich media content search system fuses the audio content search results set, the textual metadata content search results set, and the visual content search results set to generate a final search results set. The final search results set can be a ranked or unranked set of search results which identifies one or more rich media presentations (or portions thereof—time segments) that are most likely to be relevant to the search query. In an exemplary embodiment, the system can base its relevancy calculation on a number of factors, including: individual search result counts and scores, user feedback information, temporal proximity information, contextual analysis information, and/or other considerations to generate the final search results set. Generation of the final search results set is described in more detail with reference to FIGS. 11-13. In an operation 145, the system presents the final search results set to the user.

Figure 2:
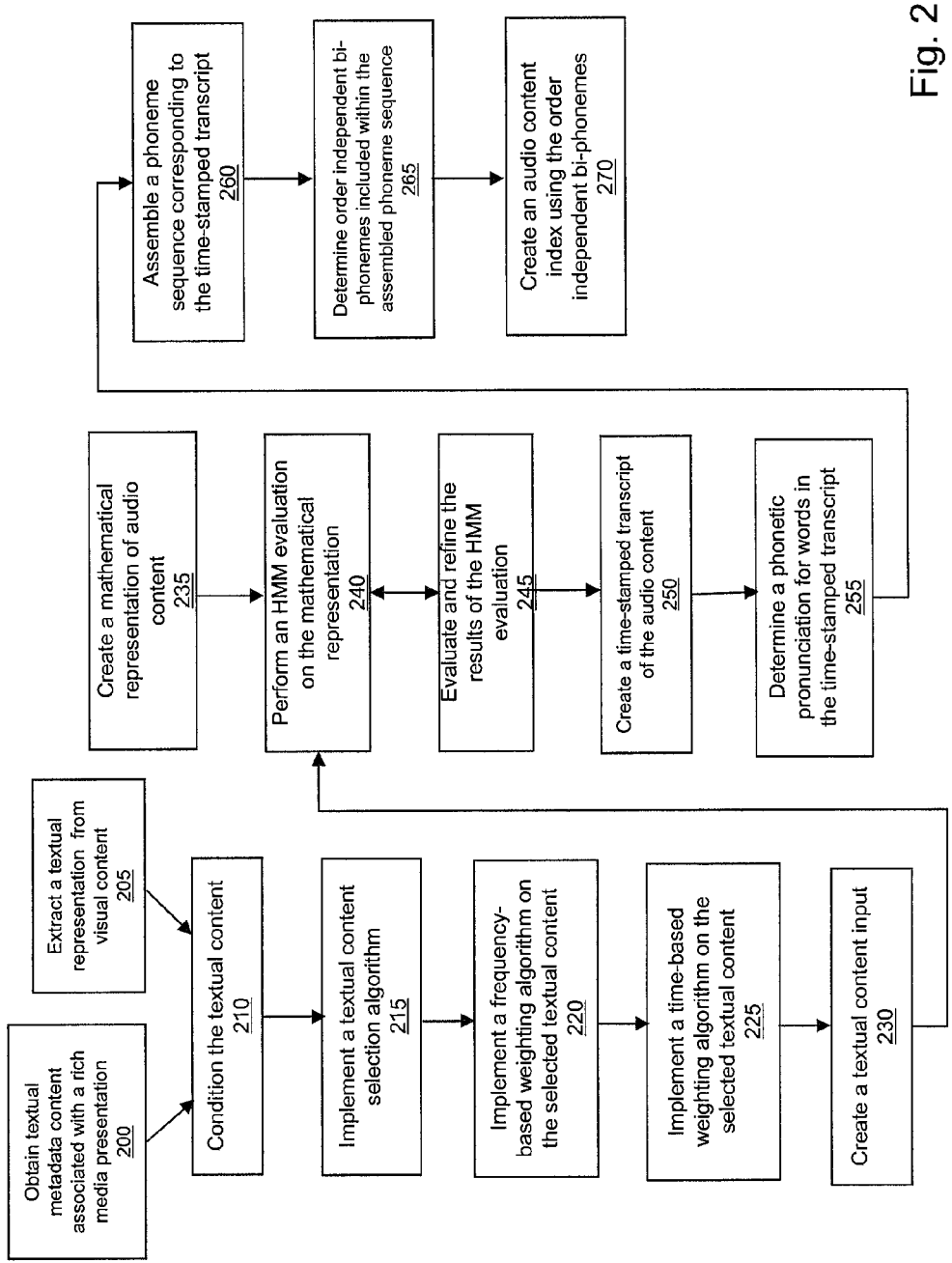
FIG. 2 is a flow diagram illustrating operations performed during the creation of an audio content index in accordance with an exemplary embodiment.

FIG. 2 is a flow diagram illustrating operations performed during the creation of an audio content index in accordance with an exemplary embodiment. Additional, fewer, or different operations may be performed in alternative embodiments. The operations described with reference to FIG. 2 can be pre-processing operations used to make audio content included in a rich media presentation searchable. In an exemplary embodiment, the system can perform these pre-processing operations prior to the receipt of a search query from a user. In another exemplary embodiment, the system can generate the audio content index by converting the output of an automatic speech recognition (ASR) algorithm into phonetic data using a phonetic data algorithm. In an exemplary embodiment, correlated, time-stamped textual content can be used in conjunction with the ASR algorithm such that the accuracy and reliability of recognized words can be increased. The correlated, time-stamped textual content can provide the ASR algorithm with clues regarding the likelihood that a particular word is contained within audio content corresponding to the rich media presentation. In alternative embodiments, any ASR algorithm known to those of skill in the art can be used during the creation of the audio content index. In an exemplary embodiment, the system can generate an audio content index for each archived rich media presentation or portion(s) thereof. The audio content indices can be used by an audio content search application to locate information within the audio content time segments. A single audio content index can also be generated for an entire rich media presentation archive.

In an operation 200, the system obtains textual metadata content associated with a rich media presentation. In an exemplary embodiment, the textual metadata content can include identifiers which are capable of conveying the relationship between the obtained words, symbols, numbers, etc. and the rich media presentation. For example, an identifier can be used to convey the relationship between the word 'superconductor' and the title of the rich media presentation. The textual metadata content can be obtained from metadata or any other data associated with the rich media presentation using any method known to those of skill in the art.

In an operation 205, the system extracts a textual representation from visual content associated with the rich media presentation. The textual representation can be obtained by implementing an extraction process on the visual content. The extraction process can include an OCR extraction process for content such as images and video. Another extraction process can be applied on software application file formats such as Microsoft's (Redmond, Wash.) PowerPoint, Word, etc. in cases where such files are available and are the basis for the visual content display. Another extraction process can be applied on formatted text such as HTML-formatted text and XML-formatted text if such formatted text is the basis for the visual content display. These and any other extraction processes can be used alone or in any combination to produce the textual representation of the visual content. In an exemplary embodiment, the extracted textual representation can include information generated or obtained during the extraction process such as word hypotheses, confidence scores of extracted words, timestamps of extracted words, time durations of extracted words, word size, word position, etc. In alternative embodiments, the textual representation can be extracted from any audiovisual content. For example, the textual representation can be extracted from a headline display included in the background of an audiovisual news broadcast.

In an operation 210, the system conditions the obtained textual metadata content and the textual representation extracted from the visual (or audiovisual) content. In an exemplary embodiment, textual content conditioning can include normalizing the textual content to conform to one or more standards, removing common words such as 'the' from the textual content, and separating the textual content into word tokens. Textual content conditioning is described in more detail with reference to FIGS. 9 and 10.

In an operation 215, the system implements a textual content selection algorithm on the textual content. The textual content selection algorithm can be used to determine which textual content may potentially be used as an input to the ASR algorithm. In an exemplary embodiment, the textual content selection algorithm can utilize one or more criteria to determine which textual content to select. For example, selected textual content can be limited to words which are included within a particular dictionary. The dictionary can be a dictionary used by the ASR algorithm to generate speech recognition data, or a different dictionary depending on the embodiment. In an exemplary embodiment, use of a dictionary can help prevent OCR errors from adversely affecting the accuracy of the ASR algorithm. In an alternative embodiment, the textual content selection algorithm can use a valid word algorithm instead of or in conjunction with, a dictionary to ensure that the word conforms to a set of word validity rules. The valid word algorithm can be any algorithm capable of determining whether a series of characters is a valid word. For example, the valid word algorithm can examine a potential word for embedded digits or other invalid characters, examine a potential word for unusual letter combinations, examine a potential word for unusual length, etc. Alternatively, the valid word algorithm can use any other techniques known to those of skill in the art.

In an exemplary embodiment, the textual content selection algorithm can also require that selected textual content be a word of a minimum length (such as three characters). In one embodiment, the textual content selection algorithm can utilize a common words list to exclude textual content which corresponds to commonly used words. The common words list can include any number of commonly used words which are either insignificant, or which the ASR algorithm is likely to accurately recognize without additional assistance. The textual content selection algorithm can also be used to exclude textual content that is used repetitiously throughout the rich media presentation. For example, header or footer text such as a legal disclaimer which is included on every slide used during a rich media presentation can be excluded by the textual content selection algorithm. In alternative embodiments, the textual content selection algorithm can utilize any other criteria such that textual content capable of aiding the ASR algorithm is selected.

In an operation 220, the system implements a frequency-based weighting algorithm on the selected textual content. The frequency-based weighting algorithm can be used to weight selected textual content based on the likelihood that the textual content will increase the accuracy of the ASR algorithm. In an exemplary embodiment, textual content which is highly likely to be beneficial to the ASR algorithm can be weighted higher than textual content which is less likely to be beneficial. The ASR algorithm can use the weight of a given word to help determine how much extra consideration to give to the word during speech recognition. In one embodiment, the frequency-based weighting algorithm can weight words based on the frequency with which the words are generally used. For example, words which are likely to appear frequently within the audio content can receive less weight than words which are unlikely to appear in the audio content. The rationale is that frequently used words are well represented within the ASR algorithm and thus are likely to be correctly recognized by the ASR algorithm. In an exemplary embodiment, word frequency information can be determined using training data and analyzing speech recognition results generated by the ASR algorithm. In an alternative embodiment, the frequency-based weighting algorithm may not be used.

In an operation 225, the system implements a time-based weighting algorithm on the selected textual content. The time-based weighting algorithm can be based on the increased probability that a presenter will verbalize a word presented as textual content during the time interval in which the word is being presented. In an exemplary embodiment, the time-based weighting algorithm can determine one or more time intervals during which a given word is presented as textual content during the rich media presentation. During the one or more time intervals, the word can be assigned an in-interval weight which is higher than an out-of-interval weight assigned to the word when the word is not being presented as textual content. As a result, the ASR algorithm is more likely to output the word when recognizing audio content which occurs within the time interval during which the word was being presented as textual content. For example, the time-based weighting algorithm can determine that the selected word 'semiconductor' was presented on a slide during the rich media presentation within the time interval from 00:17:02.34 to 00:18:10.44. During this determined time interval, the word 'semiconductor' can be assigned the in-interval weight. The out-of-interval weight can be assigned to the word 'semiconductor' during the interval from 00:00:00.00 through 00:17:02.33 and any other intervals during which the word is not being presented. As a result, the ASR algorithm is more likely to recognize the word 'semiconductor' when recognizing audio content which occurred during the interval from 00:17:02.34 to 00:18:10.44 because it is more likely that the word was spoken during that interval.

In an alternative embodiment, the time-based weighting algorithm can assign a decaying weight based on the start of an interval and the end of the interval during which the word was presented. In such an embodiment, starting at approximately 00:18:10.44, the weight assigned to the word 'semiconductor' can decay from the in-interval weight down to the out-of-interval weight. The decay can occur over a predetermined decaying time period or a decaying time period determined on-the-fly by the time-based weighting algorithm. Similarly, the weight assigned to the word 'semiconductor' can increase from the out-of-interval weight to the in-interval weight over a decaying time period which ends at approximately 00:17:02.34. The decaying time period preceding the in-interval can be the same as the decaying time period used at the end of the in-interval, or different depending on the embodiment. In an alternative embodiment, the time-based weighting algorithm may not be used. In another alternative embodiment, the system can implement the time-based weighting algorithm and the frequency-based weighting algorithm as a single algorithm.

Weight given to a word or other textual content by the time-based weighting algorithm and/or the frequency-based weighting algorithm can increase the probability that the ASR algorithm will use the word. In an exemplary embodiment, each word weighted by the frequency-based weighting algorithm can receive the same amount of weight. Similarly, each word weighted by the time-based weighting algorithm can receive the same amount of weight. Alternatively, different words can receive different weights and/or decaying time periods based on word characteristics. For example, the frequency-based weighting algorithm can give more weight to a word with a unique phonetic sequence than a word with a more common phonetic sequence. Other word characteristics can include phonetic length of the word, the frequency with which the word occurs in the visual (or audiovisual) content or textual metadata content, and/or the time interval during which the word appears. In an alternative embodiment, the weighting algorithms may not be used such that all of the selected textual content has the same likelihood of being used by the ASR algorithm.

In an operation 230, the system creates a textual content input. The textual content input can be any textual content information which is capable of being received and used by the ASR algorithm. In an exemplary embodiment, the textual content input can include each selected word or other textual content, the timestamp or time duration of each selected word which was extracted from visual (or audiovisual) content, and/or the weight(s) assigned to each selected word. In one embodiment, the textual content input can be a dynamic ASR dictionary which can be used during speech recognition by the ASR algorithm. As such, the system can use the textual content input as a tool to help improve the accuracy and reliability of words recognized by the ASR algorithm. Use of the textual content input by the ASR algorithm is described in more detail below.

In an operation 235, the system uses a feature extraction process to create a mathematical representation of the audio content. In an exemplary embodiment, the mathematical representation can be mel-frequency cepstral coefficients (MFCC) which represent features obtained from the audio content. The features can be obtained by any method known to those of skill in the art. In an alternative embodiment, the audio content can be mathematically represented by any other method known to those of skill in the art. In an operation 240, a hidden Markov model (HMM) evaluation is performed on the mathematical representation. The HMM evaluation can be used to determine grammatically likely sequences of words based on the mathematical representation of the audio content. Alternatively, the mathematical representation can be evaluated using any other method known to those of skill in the art.

The ASR algorithm can use an acoustic model, a phonetic pronunciation dictionary, a language model, and/or the above-described textual content input during the HMM evaluation. An acoustic model can be a set of models which model the relationship between the mathematical representation and phonemes such that phonemes within the audio content can be identified. A phonetic pronunciation dictionary can be used to help identify words represented by the identified phonemes. A language model can be a statistical model of the likelihood of various words and word sequences.

The textual content input can also be used by the ASR algorithm to help determine possible words and sequences of words based on the phonemes. In an exemplary embodiment, the textual content input can be used to increase the likelihood that the ASR algorithm will recognize words presented within visual content during the rich media presentation or words otherwise associated with the rich media presentation. The textual content input can also be used to increase the likelihood that the ASR algorithm, while recognizing speech from audiovisual content, will recognize words presented within the audiovisual content. In one embodiment, the textual content input can be a dynamic ASR dictionary in which dictionary entries change over the playback time of the audio content. The dictionary entries can be weighted or non-weighted words depending on the embodiment. The weight(s) can be assigned by the frequency-based weighting algorithm, the time-based weighting algorithm, and/or any other weighting algorithms known to those of skill in the art.

In an exemplary embodiment, a particular word may be included in the dynamic ASR dictionary only while the ASR algorithm is recognizing words spoken in in-interval time periods during which that particular word was being presented as textual content. During out-of-interval time periods during which the word was not being presented as textual content, the word may not be a dynamic ASR dictionary entry. Alternatively, a word in the textual content input may remain a dynamic ASR dictionary entry during a decaying time period before and/or after the in-interval time period. In another alternative embodiment, the dynamic ASR dictionary may always contain the same word entries. In such an embodiment, a word may have an increased likelihood of influencing the ASR algorithm during in-interval time periods and a decreased likelihood during out-of-interval time periods based on a weight assigned to the word. The weight assigned to the word can be a first constant value during in-interval time periods and a second constant value during out-of-interval time periods. Alternatively, the weight can decay from a first constant value during in-interval time periods to a second constant value during out-of-interval time periods over a decaying time period. In another alternative embodiment, entries in the dynamic ASR dictionary can be static and/or weight(s) assigned to entries in the dynamic ASR dictionary can be static.

In an exemplary embodiment, the system can also use the textual content input to help ensure that the ASR algorithm utilizes an optimal acoustic model, an optimal phonetic pronunciation dictionary, and/or an optimal language model. For example, words in the textual content input may appear in a first phonetic pronunciation dictionary but not in a second phonetic pronunciation dictionary. The system can ensure that the ASR algorithm utilizes at least the first phonetic pronunciation dictionary. As another example, words in the textual content input may be used to assist in the selection of an existing language model. This can be accomplished by a perplexity calculation or other techniques known to those with skill in the art. As yet another example, words in the textual content may be used to assist in the selection of an existing acoustic model. In this case, words in the textual content input may have been used in training a first acoustic model but not in a second acoustic model, and the system can ensure that the ASR algorithm utilizes at least the first acoustic model.

In an alternative embodiment, the textual content input can be used to dynamically enhance an existing phonetic pronunciation dictionary, language model, and/or acoustic model used by the ASR algorithm. For example, enhanced language models can be created by using interpolation and other techniques known to those skilled in the art. In one embodiment, the ASR algorithm can be a multi-pass ASR algorithm which uses the textual content input to improve ASR results during a second or subsequent processing passes of the audio content.

In an operation 245, the results of the HMM evaluation are evaluated and refined. Each possible sequence of words obtained from the plurality of hypotheses can represent a path and each word within the sequence of words can represent a transition along the path. The results evaluation can be implemented to determine the most likely sequences of words based on the word transitions which occur along each of the paths. The results evaluation can be implemented using the Viterbi algorithm or by any other method known to those of skill in the art. The system can refine the results by eliminating hypotheses which are found to be unlikely based on the results evaluation. In an exemplary embodiment, hypotheses which fall below a predetermined likelihood threshold can be removed. HMM evaluation and result evaluation and refinement can be an iterative process in which the results of one process are used as an input to the other process for a plurality of iterations. This iterative (or feedback) process is indicated by the double arrow in FIG. 2.

In an operation 250, a time-stamped transcript of the audio content is created based on the HMM evaluation and the results evaluation and refinement processes. The time-stamped transcript can be a best guess of the most likely sequence of words included within the audio content. The time-stamped transcript can include the starting time and ending time for each word within the transcript. In an exemplary embodiment, the ASR algorithm can also create a word lattice which includes word hypotheses, word times, word scores, and/or transition data regarding different paths used during the HMM evaluation.

In an exemplary embodiment, various operational parameters can be used to enhance the ASR algorithm and/or help ensure that the resulting time-stamped transcript is optimized for receipt by a phonetic data matching algorithm. For example, the system can modify the ASR algorithm such that acoustic similarities are favored over language probabilities when determining word hypotheses. Favoring acoustic similarities can create a better result for the phonetic data matching algorithm by helping to ensure that any word errors are acoustically similar to the correct words. In alternative embodiments, any other operational parameters of the ASR algorithm can be adjusted such that ASR results are optimized. In alternative embodiments, the ASR algorithm can be implemented by any other method known to those of skill in the art.

In an exemplary embodiment, the system can use the time-stamped transcript created by the ASR algorithm to create a phoneme-based audio content index corresponding to the audio content time segment. In an operation 255, the system uses a phonetic data algorithm to determine a phonetic pronunciation for words in the time-stamped transcript. The phonetic data algorithm can be incorporated as part of the ASR algorithm, or implemented as a distinct algorithm depending on the embodiment. In an exemplary embodiment, each word included in the time-stamped transcript can be looked up in a phonetic pronunciation dictionary. Each entry in the phonetic pronunciation dictionary can contain at least one sequence of phonemes which make up a given word. The phonetic pronunciation dictionary can be the same phonetic pronunciation dictionary used by the ASR algorithm to generate the time-stamped transcript, or a different phonetic pronunciation dictionary depending on the embodiment. If the phonetic pronunciation dictionary contains multiple pronunciations for a single word, the phonetic data algorithm can identify the pronunciation which was recognized by the ASR algorithm.

In an operation 260, the system uses the phonetic data algorithm to assemble a phoneme sequence corresponding to the time-stamped transcript. The phoneme sequence can include the phonemes determined in operation 255, the location (or order) of each phoneme within each word, and/or one or more timestamps associated with each phoneme or word. In an exemplary embodiment, a timestamp for the beginning of each word and a timestamp for the end of each word can be included in the assembled phoneme sequence. Using these two timestamps, the timestamp for each phoneme can later be determined by interpolation. Alternatively, a timestamp for each phoneme can be included in the assembled phoneme sequence. In another alternative embodiment, a single timestamp for each word can be included in the assembled phoneme sequence. In an exemplary embodiment, the phoneme sequence can be assembled into a binary stream of data that represents the time-stamped transcript created by the ASR algorithm.

In an operation 265, the system uses the phonetic data algorithm to determine order independent bi-phonemes included within the assembled phoneme sequence. A bi-phoneme can refer to any two consecutive phonemes included within the phoneme sequence. For example, the phrase 'FOAM SOFA' can be phonetically represented within the phoneme sequence by the following phonemes: F-OW-M-S-OW-F-AX. The order independent bi-phonemes resulting from the phrase 'FOAM SOFA' are: F-OW, OW-M, M-S, S-OW, OW-F, and F-AX. Because the resulting bi-phonemes are order independent, only one of bi-phoneme phoneme F-OW and bi-phoneme OW-F is listed as a resulting bi-phoneme. The use of order independent bi-phonemes results in a more compact audio content index which can help to minimize data processing. In an alternative embodiment, bi-phonemes used to create the audio content index can be order dependent.

In an operation 270, the system uses the phonetic data algorithm to create an audio content index. The system can create an audio content index for each distinct audio content time segment accessible by the system. In an exemplary embodiment, all of the created audio content indices can be integrated into a multi-array lookup table. A first array in the multi-array lookup table can include an entry for each distinct audio content time segment. For example, a first entry in the first array can correspond to audio content from presentation A, a second entry in the first array can correspond to audio content from presentation B, and so on. In an alternative embodiment, a first entry in the first array can correspond to audio content from a first chapter of presentation A, a second entry in the first array can correspond to audio content from a second chapter of presentation A, a third entry in the first array can correspond to a first chapter of presentation B, a fourth entry in the first array can correspond to a second chapter of presentation B, and so on. In an alternative embodiment, the audio content indices may not be integrated into a multi-array lookup table.

A second array in the multi-array lookup table can include a mapped sequence of every possible order independent k-phoneme combination from the phoneme sequence, where k is the number of consecutive order independent phonemes which are to be grouped together. In a bi-phoneme lookup table, two consecutive phonemes are grouped together and k equals two. In a tri-phoneme lookup table (three consecutive phonemes are grouped together) k equals three, and so on. As described in more detail with reference to FIGS. 4-6, the system can use the k-phoneme combinations to perform matches against order independent k-phonemes included in a received search query. The speed and/or accuracy of the system can be dependent on the k value used. For example, a higher k can increase the accuracy of search results while decreasing the speed at which the search results can be generated. Similarly, a lower k can decrease accuracy and increase system speed.

The total number of possible k-phoneme combinations, which depends in part on the value k, can be the same as the number of entries in the second array of the multi-array lookup table. The total number of possible k-phoneme combinations also depends on the total number of possible phonemes which can appear in the phoneme sequence. The total number of possible phonemes can be dictated by the phonetic pronunciation dictionary used to generate the phoneme sequence. In an exemplary embodiment, the phonetic pronunciation dictionary can include between forty and fifty-five possible phonemes. However, in alternative embodiments, less the forty or more than fifty-five possible phonemes can be included. Equation 1 can be used to calculate the number of entries in the second array of the lookup table, where n is the total number of possible phonemes and k is the number of consecutive order independent phonemes from the phoneme sequence which are to be grouped together.

$$\frac{n!}{k!(n-k)!} \qquad \text{Equation 1}$$

Thus, in a bi-phoneme lookup table in which k equals two and there are forty possible phonemes, there are seven hundred eighty possible order independent bi-phonemes. Similarly, in a bi-phoneme lookup table representing a phoneme sequence that was obtained using fifty-five possible phonemes, there are one thousand four hundred eighty-five possible order independent bi-phonemes. In an exemplary embodiment, an ordinal function can be used to sequentially map each possible order independent k-phoneme combination into the second array. In a bi-phoneme lookup table, the ordinal function can be represented by Equation 2 in which x and y are numbers representing uniquely numbered phonemes which occur in a phonetic sequence, and y is a larger number than x. In an exemplary embodiment, a different ordinal function can be used to map tri-phonemes, another different ordinal function can be used to map quad-phonemes, and so on.

$$\frac{y(y-1)}{2} + x \qquad \text{Equation 2}$$

FIGS. 3A and 3B illustrate information which can be included in a multi-array bi-phoneme lookup table in accordance with an exemplary embodiment. For demonstration purposes, the simplified phoneme sequence 'F-OW-M-S-OW-F-AX' is used. The phoneme sequence 'F-OW-M-S-OW-F-AX,' which corresponds to the phrase 'FOAM SOFA,' includes the following five distinct phonemes: F, OW, M, S, and AX. Each distinct phoneme can be assigned an identification number based on order of occurrence. The identification number of phoneme F can be zero, the identification number of phoneme OW can be one, the identification number of phoneme M can be two, the identification number of phoneme S can be three, and the identification number of phoneme AX can be four. In addition, each phoneme in the phrase can be assigned one or more location values corresponding to location(s) at which the phoneme appears within the phrase. For example, phoneme F occurs at location zero and location five, phoneme OW occurs at location one and location four, phoneme M occurs at location two, phoneme S occurs at location three, and phoneme AX occurs at location six. FIG. 3A is a table illustrating the location value and identification number for each phoneme in the phrase 'FOAM SOFA.'

Assuming (for simplicity) that n, the total number of possible phonemes, is equal to five and that a bi-phoneme lookup table is being created (i.e., k equals two), Equation 1 indicates that there are ten possible order independent bi-phonemes. Equation 2 can be used to map each of the ten order independent bi-phonemes into an ordered sequence of bi-phonemes using the identification numbers illustrated with reference to FIG. 3A. For example, F has been assigned identification number zero and OW has been assigned identification number one based on the order in which the phonemes occur in the sequence. Substituting x equals zero (the smaller value) and y equals one (the larger value) into Equation 2 results in a value of zero. Thus, the bi-phoneme F-OW (or OW-F) is mapped to location zero in the second array. Similarly, the phoneme M has been assigned identification number two and the phoneme AX has been assigned identification number four. Substituting x equals two and y equals four into Equation 2 results in a value of eight. Thus, the bi-phoneme M-AX (or AX-M) is mapped to location eight in the second array. FIG. 3B is a table illustrating each of the ten possible order independent bi-phonemes, the mapping location of each bi-phoneme, and the starting location of each bi-phoneme within the phoneme sequence in accordance with an exemplary embodiment.

Figure 3C:
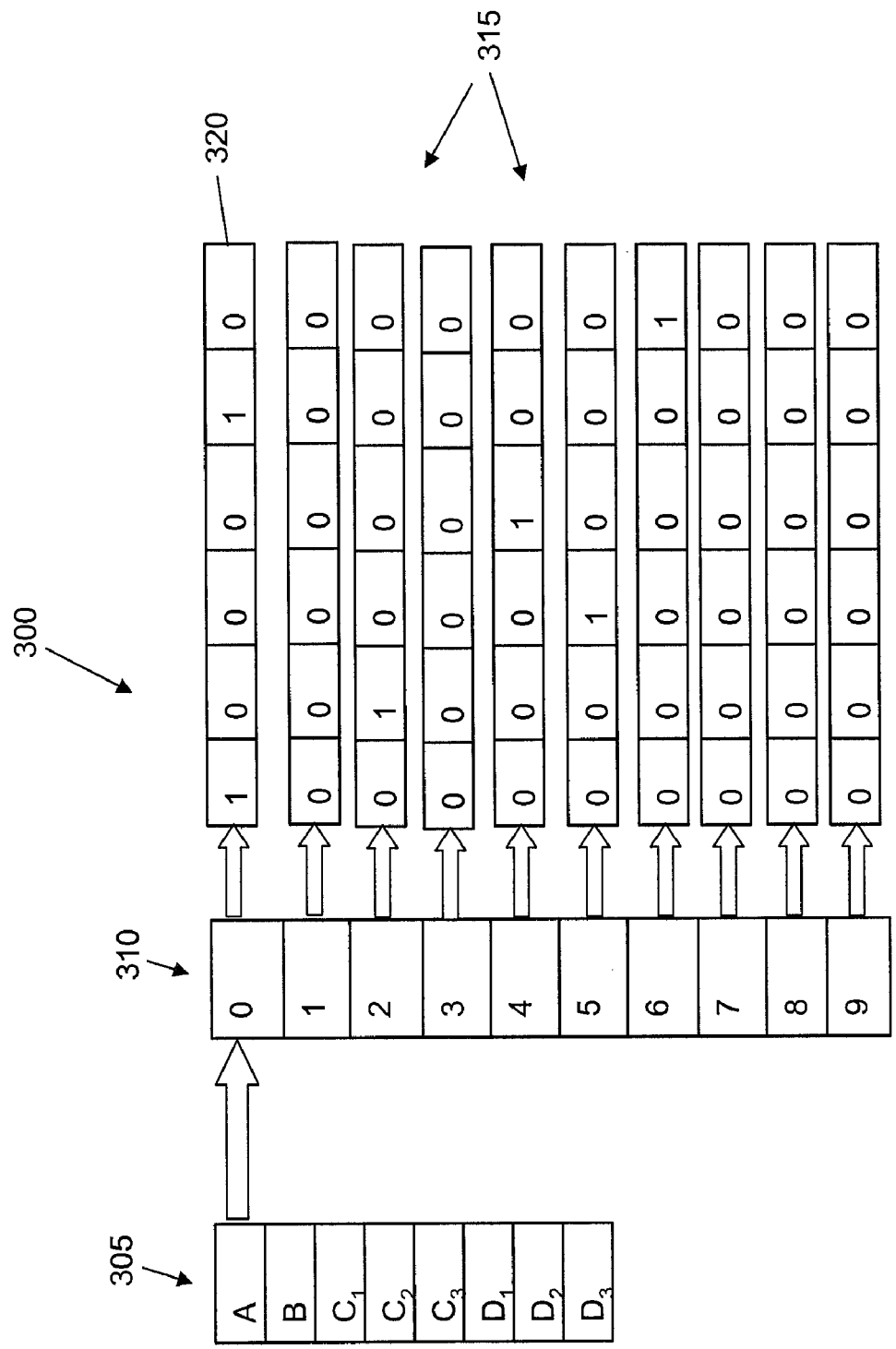
FIG. 3C illustrates a multi-array lookup table in accordance with an exemplary embodiment

In an exemplary embodiment, a third array of the multi-array lookup table can include the starting location information illustrated with reference to FIG. 3B. FIG. 3C illustrates a multi-array lookup table 300 in accordance with an exemplary embodiment. A first array 305 of the multi-array lookup table 300 can include an entry for each archived audio content time segment. In an exemplary embodiment, audio content A can be a brief audio clip corresponding to the above-described phoneme sequence 'F-OW-M-S-OW-F-AX.' Audio content B can be audio content associated with a rich media presentation B. Audio content $C_1$ can be audio content associated with a first chapter of a rich media presentation C, audio content $C_2$ can be audio content associated with a second chapter of rich media presentation C, and so on. Audio content $D_1$ can be audio content generated by a first presenter during a rich media presentation D, audio content $D_2$ can be audio content generated by a second presenter during rich media presentation D, and so on.

A second array 310 can be a mapped array with one entry corresponding to each possible order independent bi-phoneme obtained from the phoneme sequence corresponding to audio content A. As described with reference to FIG. 3B, Equation 2 can be used to map the order independent bi-phonemes into the second array 310. A plurality of third arrays 315 is also illustrated with reference to FIG. 3C. Each third array within the plurality of third arrays 315 can be a data array containing information regarding the starting location(s) of a particular bi-phoneme within the phoneme sequence. In an exemplary embodiment, each third array within the plurality of third arrays 315 can include a number of entries equal to the number of possible starting locations within the phoneme sequence. For example, the phoneme sequence 'F-OW-M-S-OW-F-AX' corresponding to audio content A includes six starting locations (the last phoneme does not correspond to a starting location because no phoneme follows it). Within each entry of the third array, a one value can indicate that a particular bi-phoneme has a starting location at a given location within the phoneme sequence and a zero value can indicate that the bi-phoneme does not have a starting location at the given location within the phoneme sequence. For example, a third array 320 can correspond to the order independent bi-phoneme associated with mapped location zero in the second array 310. As described with reference to FIG. 3B, for the phoneme sequence 'F-OW-M-S-OW-F-AX,' mapped location zero corresponds to the phoneme F-OW (or OW-F). The third array 320 has ones in entry zero and entry four indicating that the phoneme F-OW (or OW-F) has a starting location at location zero of the phoneme sequence and at location four of the phoneme sequence. In an alternative embodiment, the starting locations of bi-phonemes can be included in the third array by any other method known to those of skill in the art. For example, instead of placing ones and zeros in a plurality of entries, each third array can include a single entry which contains a list of starting locations for a given order independent bi-phoneme.

In an alternative embodiment, the lookup table can be a single array lookup table, a double array lookup table, a four array lookup table, etc. In another alternative embodiment, the audio content index may not be in the form of a bi-phoneme lookup table. For example, the audio content index can be in the form of a phoneme lookup table, a tri-phoneme lookup table, a quad-phoneme lookup table, a penta-phoneme lookup table, etc. In another alternative embodiment, the lookup table can include a fourth array that includes timestamp information for words and/or phonemes. In another alternative embodiment, timestamp information can be included as entries in any of the first array, the second array, and/or the third array. In another alternative embodiment, the audio content index may not be in the form of a lookup table. For example, the audio content index can be in the form of any other data structure which can be used by the system to efficiently locate phonemes which occur in an audio content time segment.

Figure 4:
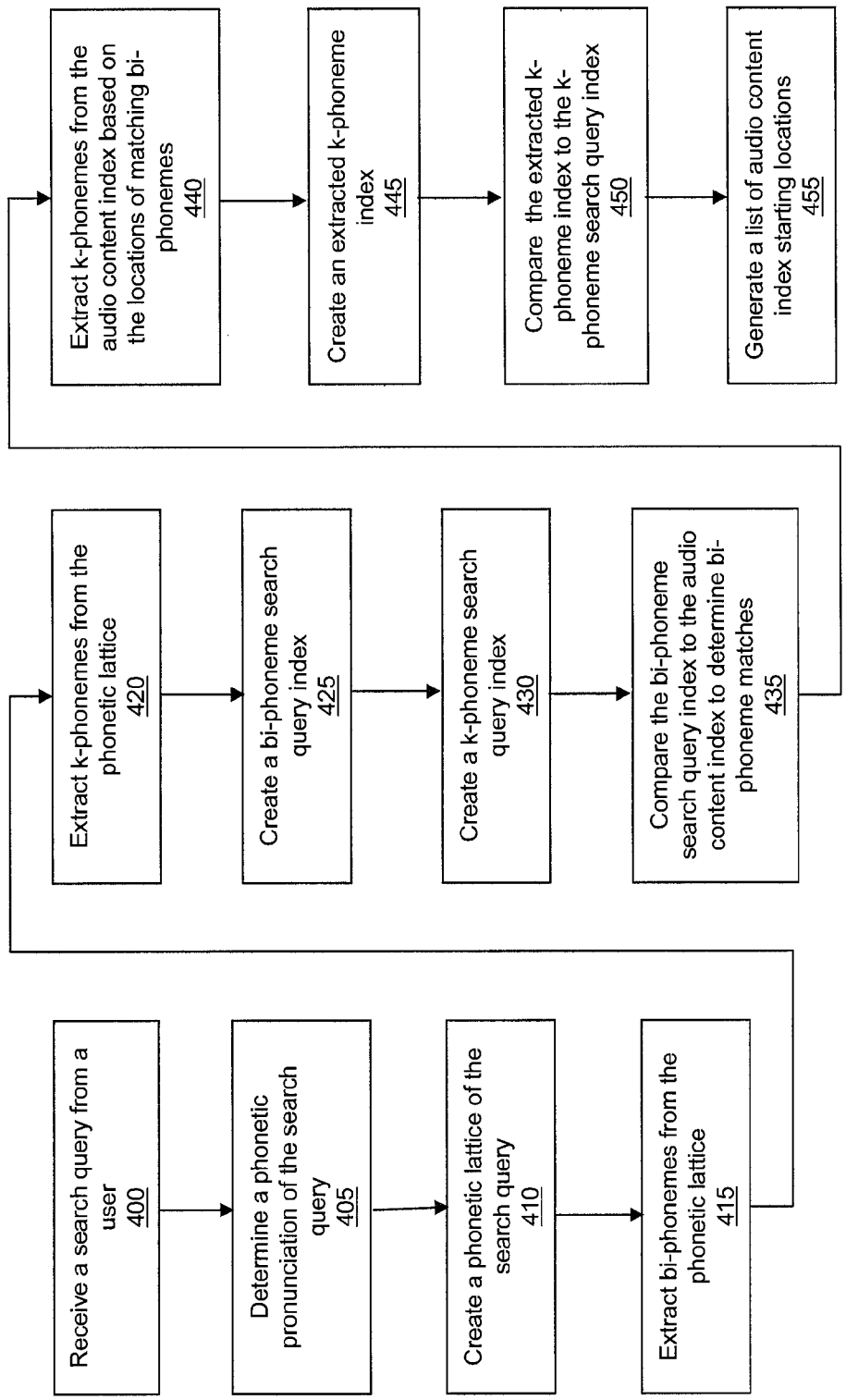
FIG. 4 is a flow diagram illustrating operations performed by the system during the creation of a list of audio content index starting locations in accordance with an exemplary embodiment.

FIG. 4 is a flow diagram illustrating operations performed by the system during the creation of a list of audio content index starting locations in accordance with an exemplary embodiment. Additional, fewer, or different operations may be performed in alternative embodiments. In an exemplary embodiment, the operations described with reference to FIG. 4 can be performed on each audio content index created by the system. In an operation 400, the system receives a search query from a user. For simplicity, it is assumed that the received search query is a text-based search query. However, it is to be understood that the search query can be any type of search query known to those of skill in the art and that the system is not limited to text-based search queries. For example, the search query can be an audio search query, and the system can utilize the ASR algorithm and phonetic data algorithm described with reference to FIG. 2 to generate phonemes corresponding to the audio search query.

In an operation 405, the system determines a phonetic pronunciation of the search query. In an exemplary embodiment, every possible phonetic pronunciation for each word/phrase within the search query can be determined. The phonetic pronunciation can be determined by using a phonetic pronunciation dictionary. In an exemplary embodiment, the phonetic pronunciation dictionary can be the same phonetic pronunciation dictionary used by the phonetic data algorithm. In an alternative embodiment, the phonetic pronunciation of the search query can be determined by a guessing algorithm. The guessing algorithm can be a rules-based algorithm which parses words of the search query based on the words' spelling. The guessing algorithm can use the rules to transform each parsed word into a series of phonemes. The rules used by the guessing algorithm can be language rules which are generally followed by the words within the language. For example, a rule might state that if the letters 'a,' 'l,' and 's' appear at the end of a word and are preceded by a vowel and zero or more consonants, the phonetic pronunciation for that portion of the word can be 'AX-L-Z.' In an exemplary embodiment, the rules can be applied in an hierarchical fashion such that rules for larger numbers of characters can be attempted, followed by rules for smaller numbers of characters, and so on until individual characters are translated to phonemes in cases where no other rules apply.

Figures 5A, 5B, 5C, 5D:
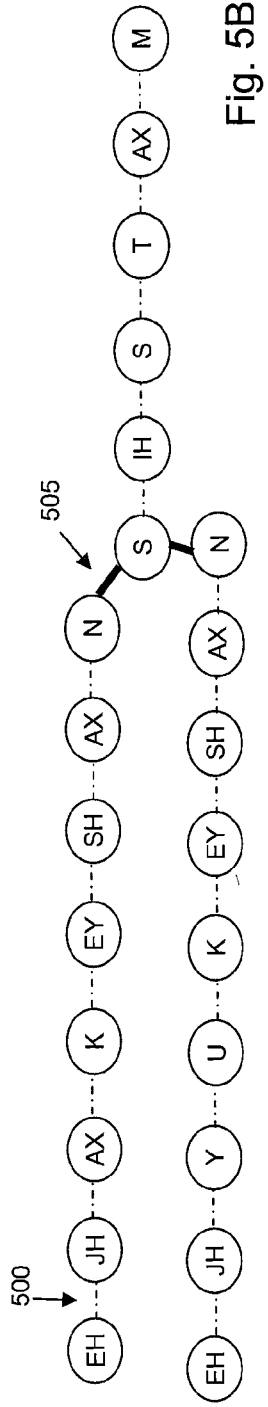
FIG. 5A illustrates possible phonetic pronunciations for the search query 'EDUCATION SYSTEM' in accordance with an exemplary embodiment.
FIG. 5B illustrates an uncompressed phonetic graph for the search query 'EDUCATION SYSTEM' in accordance with an exemplary embodiment.
FIG. 5C illustrates a compressed phonetic graph for the search query 'EDUCATION SYSTEM' in accordance with an exemplary embodiment.
FIG. 5D is a table illustrating bi-phonemes and tri-phonemes of the phrase 'EDUCATION SYSTEM' in accordance with an exemplary embodiment.

In an alternative embodiment, the phonetic pronunciation dictionary and the guessing algorithm can be used in conjunction with one another. For example, the guessing algorithm can be used to determine alternate pronunciations of words which are included in the phonetic pronunciation dictionary. Alternatively, the guessing algorithm can be used only for words which are not included in the phonetic pronunciation dictionary. In one embodiment, the system can separate words from the search query into multiple words to determine the phonetic pronunciation. For example, a search word '123' can be separated into the words 'one two three' and/or the words 'one hundred twenty-three.' Similarly, a search word 'ABC' can be phonetically spelled out as 'AY-BEE-SEE.' FIG. 5A illustrates two possible phonetic pronunciations for the search query 'EDUCATION SYSTEM' in accordance with an exemplary embodiment. These phonetic pronunciations can be obtained from the phonetic pronunciation dictionary, the guessing algorithm, and/or any other method known to those of skill in the art for converting a word into phonemes.

In an operation 410, the system creates a phonetic lattice of the search query using the determined phonetic pronunciations. The phonetic lattice can be any data structure capable of representing all of the possible phonetic pronunciations of each word in the search query. As described in more detail below, the phonetic lattice can be used to minimize the number of comparisons between the search query and the audio content index, thereby reducing search time. In an exemplary embodiment, the phonetic lattice can be created in the form of a phonetic graph. Each phoneme in the search query can be represented as a node of the phonetic graph, and each possible pronunciation of the search query can be represented as a path through the nodes of the phonetic graph. The phonetic graph can be acyclic and bi-directionally linked such that the graph can be traversed in both a forward direction and a backward direction. FIG. 5B illustrates an uncompressed phonetic graph for the search query 'EDUCATION SYSTEM' in accordance with an exemplary embodiment. In the uncompressed phonetic graph, a dashed line can represent a bidirectional path 500 between the phonemes of a word. A thick bold line can represent a word boundary 505 between consecutive words in the search query. The word boundary 505 can also be a bidirectional path between phonemes.

In an exemplary embodiment, the system can compress the phonetic graph to eliminate repetitious partial paths through the phonetic graph. A compressed phonetic graph can retain all of the unique possible phonetic sequences corresponding to the search query while containing less nodes than an uncompressed phonetic graph. Phonetic graph compression can be implemented by merging any duplicate nodes which yield a plurality of identical partial paths through the graph. For each word within the search query, compression can be performed in the forward direction starting at the beginning of the word and the backward direction starting at the end of the word.

FIG. 5C illustrates a compressed phonetic graph for the search query 'EDUCATION SYSTEM' in accordance with an exemplary embodiment. Phonemes of the word 'EDUCATION' have been compressed such that duplicative nodes are combined. Specifically, the phonemes EH and JH, which are present in both possible pronunciations of 'EDUCATION,' have been compressed into a single partial path. The phonemes K, EY, SH, AX, and N have also been compressed into a single partial path. The partial path including the phonemes JH-AX-K preserves the unique aspect of the first pronunciation illustrated with reference to FIG. 5A, and the partial path including the phonemes JH-Y-U-K preserves the unique aspect of the second pronunciation illustrated with reference to FIG. 5A. The use of a phonetic graph is not meant to be limiting. In alternative embodiments, the phonetic lattice can be any other data structure(s) capable of conveying each possible phonetic pronunciation of the search query.

In an exemplary embodiment, the phonetic lattice of the search query can be used to quickly and efficiently identify relevant audio content index locations within the audio content index. The phonetic lattice can also provide a threshold for total system work by limiting the scope of the search process to a predetermined number of audio content index starting locations which have the highest probability of producing relevant search results. To use the phonetic lattice in conjunction with the audio content index, phoneme data can be extracted from the phonetic lattice. In an operation 415, the system extracts bi-phonemes from the phonetic lattice. The bi-phonemes can be any two consecutive order independent phonemes within the phonetic lattice of the search query. In an alternative embodiment, k-phonemes (where k can be 1, 3, 4, 5, etc.) can be extracted from phonetic lattice instead of bi-phonemes.

Referring again to FIG. 4, in an operation 420, the system extracts k-phonemes from the phonetic lattice. In an exemplary embodiment, the k-phonemes can be order independent tri-phonemes. A tri-phoneme can be any three consecutive order independent phonemes within the phonetic lattice of the search query. In alternative embodiments, the k-phonemes can be phonemes, quad-phonemes, penta-phonemes, etc. As described in more detail below, the system can use the k-phonemes from the search query to identify corresponding k-phonemes within the audio content indices.

FIG. 5D is a table illustrating bi-phonemes and tri-phonemes of the phrase 'EDUCATION SYSTEM' in accordance with an exemplary embodiment. The bi-phonemes and tri-phonemes can be restricted to individual words of the search query. As a result, the bi-phoneme N-S, and the tri-phonemes AX-N-S and N-S-IH are not included in the table. However, in alternative embodiments, the bi-phonemes and/or k-phonemes can span word boundaries. The tri-phoneme S-IH-T is included in the table because the tri-phoneme S-IH-S contains the phoneme S twice and is not order independent. In an exemplary embodiment, the system can go up to k phonemes past a duplicate phoneme to find another phoneme which results in an order independent k-phoneme. Alternatively, the system can go any other number of phonemes past a duplicate phoneme to create an order independent k-phoneme. In another alternative embodiment, the system can entirely exclude a k-phoneme which is not order independent. In yet another alternative embodiment, the system can allow order dependent bi-phonemes and/or k-phonemes.

In an operation 425, the system creates a bi-phoneme search query index. In an exemplary embodiment, the bi-phoneme search query index can include information identifying the bi-phonemes which have been extracted from the search query and/or the locations of the bi-phonemes within the search query. In an operation 430, a k-phoneme search query index is created. In an exemplary embodiment, the k-phoneme search query index can include information identifying the k-phonemes which have been extracted from the search query, and/or the location of the k-phonemes within the search query. In an alternative embodiment, the bi-phoneme search query index and the k-phoneme search query index can be implemented as a single combined search query index. The bi-phoneme search query index and/or the k-phoneme search query index can be implemented as multi-array lookup tables similar to those described with reference to FIGS. 2 and 3. Alternatively, the bi-phoneme search query index and/or the k-phoneme search query index can be any other data structure(s) capable of holding phonetic information corresponding to the search query.

In an operation 435, the system compares the bi-phoneme search query index to the audio content index to determine bi-phoneme matches. In an exemplary embodiment, the comparison can be used to identify starting locations within the audio content index such that a k-phoneme comparison can be implemented. For example, if the search query includes the word 'SYSTEM' (S-IH-S-T-AX-M), T-AX can be one of the order independent bi-phonemes in the bi-phoneme search query index. The system can identify occurrences of the bi-phoneme T-AX in each audio content index. The system can also identify the location of each occurrence of the bi-phoneme T-AX in each audio content index. The location information can be temporarily stored in any computer-readable data structure. The system can repeat this matching process for each of the other order independent bi-phonemes in the bi-phoneme search query index.

In an operation 440, the system extracts k-phonemes from the audio content index based on the locations of matching bi-phonemes. In an exemplary embodiment, the k value of the extracted k-phonemes can equal the k value of the k-phonemes within the k-phoneme search query index. For example, the system can extract tri-phonemes from the audio content index if the k-phoneme search query index contains tri-phoneme data regarding the search query. The extracted k-phonemes can be order independent k-phonemes which include at least a portion of the matched bi-phonemes. The system can locate the k-phonemes by examining each location within the audio content index in which a matching bi-phoneme was identified in operation 435.

As an example, the search query and an audio content index being searched can both include the word 'SYSTEM' (S-IH-S-T-AX-M). The system may identify thirty-three occurrences of the bi-phoneme T-AX within the audio content index. The system can extract one or more actual k-phonemes which occur at each of the thirty-three identified locations. Assuming that the fifth identified location corresponds to the word 'SYSTEM' within the audio content transcript and that tri-phones are being extracted, the tri-phoneme extracted at the fifth identified location can be T-AX-M. In an exemplary embodiment, the system can extract a single k-phoneme at each identified location within the audio content index. Alternatively, the system can extract one or more k-phonemes at each identified location within the audio content index. For example, at the fifth identified location in the example above, the system can extract the tri-phoneme S-T-AX in addition to the tri-phoneme T-AX-M. In an exemplary embodiment, the k-phoneme extraction process can be repeated until one or more k-phonemes have been extracted from each location identified during the bi-phoneme matching process. In an exemplary embodiment, the entire process can be repeated for each audio content index accessible by the system.

In an operation 445, the system creates an extracted k-phoneme index. The extracted k-phoneme index can include information identifying the k-phonemes extracted from the audio content index, the locations of the extracted k-phonemes within the audio content index, and/or the timestamp(s) of the extracted k-phonemes. The extracted k-phoneme index can be any computer-readable data structure capable of holding extracted k-phoneme information. In an exemplary embodiment, the extracted k-phoneme index can be created on-the-fly to decrease index storage overhead while providing the high degree of specificity which can be obtained by using higher order k-phonemes.

In an operation 450, the system compares the extracted k-phoneme index to the k-phoneme search query index. In an exemplary embodiment, the comparison can be used to identify the location of any k-phoneme in the audio content index which is the same as a k-phoneme contained in the search query. The identified locations of k-phoneme matches can be audio content index starting locations within the audio content index. As described in more detail with reference to FIG. 6, the audio content index starting locations can be used by the system as starting points for conducting a more detailed comparison between the phonetic lattice of the search query and the audio content index. In an alternative embodiment, the operations 435, 440, and 445 can be skipped, and the system can implement a direct comparison of the k-phoneme search query index and the audio content index. However, a direct k-phoneme comparison can take longer and may require more memory and/or processing power.

In an operation 455, a list of the audio content index starting locations is generated by the system. The list of audio content index starting locations can be temporarily stored pending implementation of a more detailed search of the audio content index. In alternative embodiments, the system can impose restrictions to limit the number and/or increase the quality of audio content index starting locations. In one embodiment, the system can require k-phonemes within the audio content index to be in the same order as the k-phonemes in the search query. Order dependence can be imposed as a revision upon the completed list of audio content index starting locations. Alternatively, order dependence can be implemented during any of the comparison operations described with reference to FIG. 4. In another alternative embodiment, the system can compare only a subset of bi-phonemes and/or k-phonemes from the search query with the audio content index. For example, commonly used bi-phonemes can be excluded from comparison because seldom used bi-phonemes are more likely to generate relevant search results. The uniqueness of a bi-phoneme can be determined through a statistical analysis of a plurality of phonetic data streams.

Figure 6:
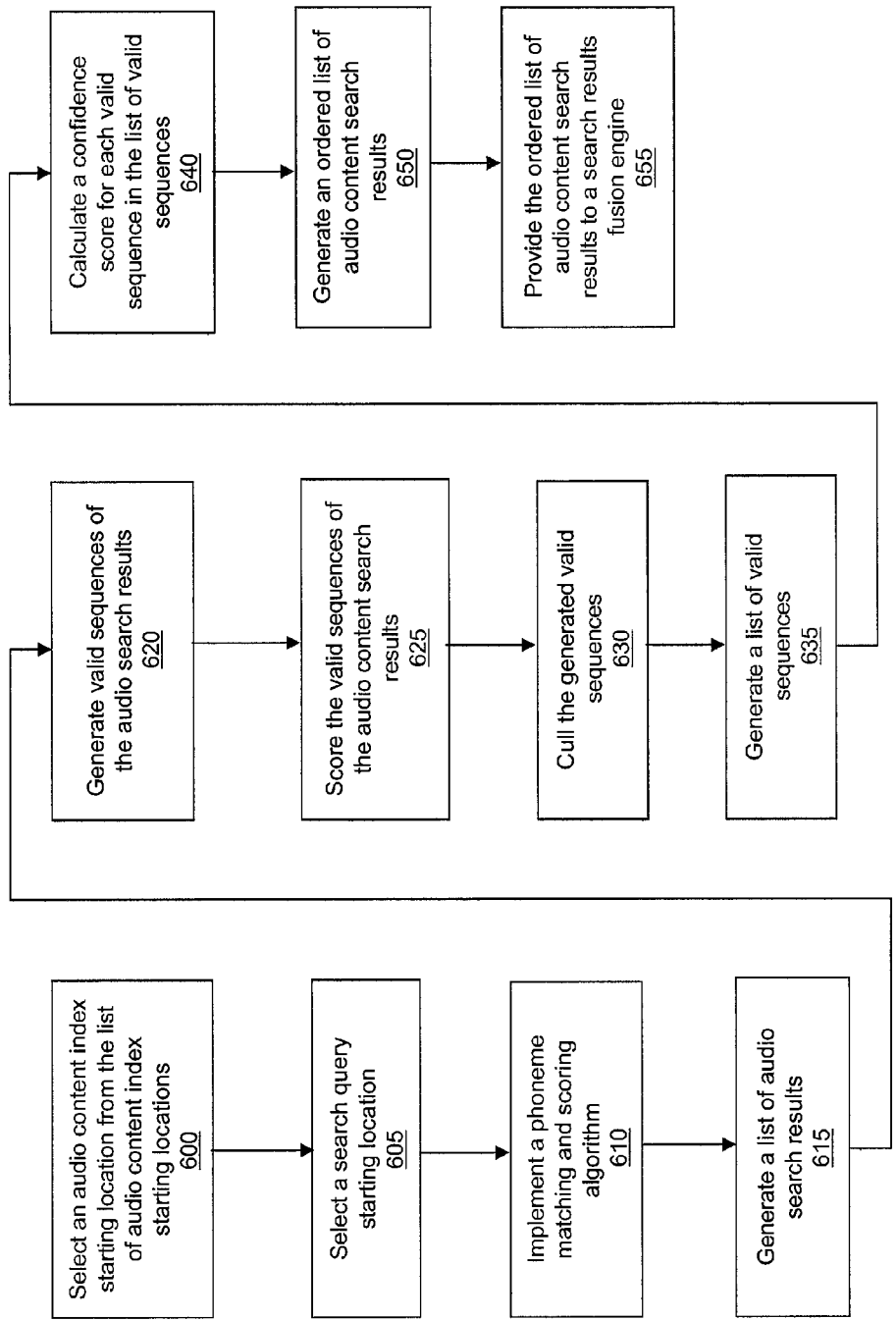
FIG. 6 is a flow diagram illustrating operations performed by the system during the creation of audio content search results in accordance with an exemplary embodiment.

FIG. 6 is a flow diagram illustrating operations performed by the system during the creation of audio content search results in accordance with an exemplary embodiment. Additional, fewer, or different operations may be performed in alternative embodiments. In an operation 600, an audio content index starting location is selected from the list of audio content index starting locations. The selected audio content index starting location can be any of the audio content index starting locations identified during the comparison of the extracted k-phoneme index to the k-phoneme search query index. In an exemplary embodiment, the selected audio content index starting location can be the starting location with the earliest timestamp. Alternatively, the audio content index starting location can be randomly selected or selected using any other criteria.

In an operation 605, a search query starting location is selected. In an exemplary embodiment, the search query starting location can be any phoneme contained in any word of the search query. For example, the selected search query starting location can be the first phoneme of the first word of the search query, the second phoneme of the first word of the search query, the last phoneme of the first word of the search query, the third phoneme of the fourth word of the search query, the last phoneme of the last word of the search query, etc. In an exemplary embodiment, the search query starting location can be a phoneme within the tri-phoneme which was used to identify the audio content index starting location. The search query starting location can be used as a starting point for comparing phonemes of the search query to phonemes located at and around the selected audio content index starting location.

In an operation 610, the system implements a phoneme matching and scoring algorithm. In an exemplary embodiment, the phoneme matching and scoring algorithm utilizes a fuzzy pattern matching process to find both partial and exact matches between the phonetic lattice corresponding to the search query and the audio content index corresponding to an audio content time segment. The phoneme matching and scoring algorithm can compare individual phonemes from the phonetic lattice to individual phonemes within the audio content index. The comparison can be implemented on a word-by-word basis such that phonemes of each word within the search query can be compared to phonemes located at or around each of the audio content index starting locations. In an alternative embodiment, the comparison may not be implemented on a word-by-word basis. For example, the search query may include quotation marks which indicate that an exact phrase is required in search results. In such a case, the sequence of phonemes representing the exact phrase can be compared to phonemes in the audio content index at each of the audio content index starting locations.

Phoneme matching can be implemented in a forward direction starting at the audio content index starting location and a backward direction starting at the audio content index starting location. In an exemplary embodiment, a score can be assigned to potential matches as the phoneme matching is being implemented. As such, each potential match can receive a score for matching in the forward direction and a score for matching in the backward direction. A composite score for the potential match can be obtained by summing the forward direction score and backward direction score. In an exemplary embodiment, if a score in either direction is less than a predetermined threshold, the matching process can be aborted and the phoneme matching and scoring algorithm can move on and begin performing one or more matches at the next audio content index starting location.

In an exemplary embodiment, the scoring system can be a penalty based scoring system. For example, the phoneme matching and scoring algorithm can assign points to a potential match based on exact matches, insertions, substitutions, and deletions. An exact match can occur when a phoneme in the audio content index is an exact match to a phoneme in the phonetic lattice. In an exemplary embodiment, an exact match can receive a penalty of zero. An insertion can refer to a phoneme in the audio content index that lies between two phonemes which match two consecutive phonemes in the phonetic lattice. For example, the audio content index can include the phonemes . . . F-OW-S-M . . . and the phonetic lattice can include the phonemes F-OW-M corresponding to the word 'FOAM' in the search query. The phoneme S in the audio content index can be an insertion because it falls between the phonemes OW and M, and OW and M match the consecutive phonemes OW-M in the phonetic lattice.

In an exemplary embodiment, the severity of a penalty assigned for an insertion can be based on whether the insertion is a preferred insertion or a non-preferred insertion. A non-preferred insertion can be penalized more than a preferred insertion. A non-preferred insertion can be an insertion which is unlikely to occur in between the consecutive phonemes in the phonetic lattice. For example, the phonetic lattice corresponding to the search query can include the phoneme sequence AH-B and the audio content index can include the sequence . . . AH-AX-B . . . . The insertion of the phoneme AX can be a preferred insertion because AX is similar in sound to AH and may be due to a particular individual's pronunciation of the word. Using the same example, insertion of the phoneme SH may be a non-preferred insertion because SH is highly dissimilar to AH and B and is not likely the result of an alternative pronunciation of the word. Phonetic similarity can be determined by observing and analyzing trends in a large corpus of speech recognition data, by a linguistic evaluation of a phoneme set, or by any other techniques known to those of skill in the art. In one embodiment, gradient levels of penalty may be applied based on properties of the phonemes which surround an inserted phoneme.

A substitution can refer to a phoneme in the audio content index which does not match a phoneme in the phonetic lattice, but which is in between two phonemes which do match phonemes in the phonetic lattice. For example, the audio content index can include the phonemes . . . F-AW-M . . . and the phonetic lattice can include the phonetic sequence 'F-OW-M.' The phoneme AW in the audio content index can be a substitution because it falls between two matching phonemes (F and M) in the phonetic lattice but does not match OW.

In an exemplary embodiment, the severity of a penalty assigned for a substitution can be based on whether the substitution is a preferred substitution or a non-preferred substitution. A non-preferred substitution can be penalized more than a preferred substitution. A preferred substitution can occur when the substitute phoneme in the audio content index is phonetically similar to the phoneme in the phonetic lattice which is being substituted. For example, a phonetic pronunciation of the word 'COT' may be 'C-AA-T,' and a phonetic pronunciation of the word 'CAUGHT' may be 'C-AO-T.' Because the phonemes AA and AO sound somewhat alike, substitution of one phoneme for the other can be a preferred substitution. However, substituting the phoneme SH as in 'SHIRT' for the phoneme AA can be a non-preferred substitution because the two phonemes are dissimilar. Phonetic similarity can be determined by observing and analyzing trends in a large corpus of speech recognition data. In one embodiment, gradient levels of penalty may be applied depending on the phoneme substitution being made.

A deletion can refer to a phoneme in the phonetic lattice which is missing from the audio content index. For example, the audio content index can include the phonemes . . . F-M . . . and the phonetic lattice can include the phonemes F-OW-M corresponding to the word 'FOAM' in the search query. The phoneme OW in the phonetic lattice can be a deletion because it does not appear between the phonemes F and M in the audio content index. In an exemplary embodiment, the penalties assigned for substitutions, insertions, exact matches, and deletions can vary from one another. For example, an exact match can receive a penalty of zero, a preferred substitution can receive a penalty of negative one, a deletion can receive a penalty of negative one and one half, and a preferred insertion can receive a penalty of negative two. Alternatively, any other values can be used for any the assigned penalties. In another alternative embodiment, one or more of the penalties can be assigned the same penalty value.

Figures 7A, 7B:
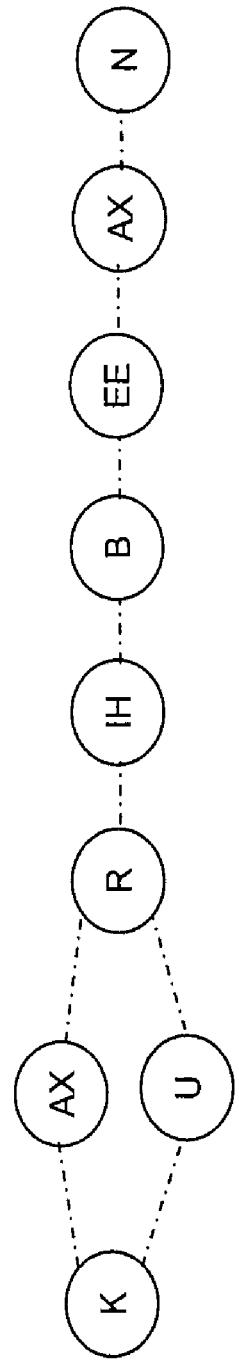
FIG. 7A illustrates a phonetic sequence within an audio content index in accordance with an exemplary embodiment.
FIG. 7B illustrates a phonetic lattice corresponding to the search query 'CARIBBEAN' in accordance with an exemplary embodiment.

As an example of phoneme matching and scoring, FIG. 7A illustrates a phonetic sequence within a audio content index in accordance with an exemplary embodiment. The phoneme R within the audio content index can be an identified audio content index starting location. FIG. 7B illustrates a phonetic lattice corresponding to the search query 'CARIBBEAN' in accordance with an exemplary embodiment. The phoneme R can be a search query starting location. In an exemplary embodiment, the phoneme matching and scoring algorithm can compare the phonetic lattice of the search query to the audio content index in a forward direction starting at the respective starting locations. The phoneme R corresponding to the audio content index starting location and the phoneme R corresponding to the search query starting location are an exact match and can receive a penalty of zero. In the forward direction, the phoneme IH, which follows the phoneme R in the phonetic lattice, and the phoneme IH, which follows the phoneme R in the audio content index, are an exact match and can receive a penalty of zero. The phoneme B, which follows the phoneme IH in the phonetic lattice, does not match the phoneme EE, which follows the phoneme IH in the audio content index. However, the phoneme EE follows the phoneme B in the phonetic lattice. Thus, a deletion penalty can be assigned to the match. In an exemplary embodiment, the deletion penalty can be negative two. The phonemes AX and N, which follow the phoneme EE in the phonetic lattice and the audio content index, are exact matches and can receive a penalty of zero. Thus, in the forward direction, the match can receive a score of negative two.

In the backward direction, the phonetic lattice has an upper path and a lower path which can be matched to the audio content index. Along the upper path, the phoneme AX, which precedes the phoneme R in the phonetic lattice, is an exact match to the phoneme preceding R in the audio content index and can receive a score of zero. Similarly, the phoneme K in the phonetic lattice and the audio content index are exact matches and can receive a score of zero. Along the lower path, the phoneme U in the phonetic lattice does not match the phoneme AX in the audio content index. In an exemplary embodiment, the phoneme AX in the audio content index can be a substitution and receive a penalty of negative one. The phoneme K is an exact match and can receive a penalty of zero. Thus, in the backward direction, the upper path has a total score of zero and the lower path has a total score of negative one. The composite score of the match using the upper path is negative two, and the composite score of the match using the lower path is negative three.

In another exemplary embodiment, if the composite score of a match is above a predetermined threshold, the phoneme matching and scoring algorithm can automatically match and score words in the search query which are adjacent to the already matched word. As such, the phoneme matching and scoring algorithm can potentially perform a match for every word in the search query at each of the audio content index starting locations. In an exemplary embodiment, this can be referred to as a "depth first" approach in which matches at a single audio content index starting location are fully evaluated to the point of success or failure prior to beginning matches at the next audio content index starting location. The phoneme matching and scoring algorithm can use scores generated as the matches are being made to determine whether the phoneme comparison at a given audio content index starting location should be continued or abandoned.

As an example, a search query can include the words 'EFFICIENT,' 'FUEL,' 'CELL,' and 'TECHNOLOGY,' in that order. The phoneme matching and scoring algorithm can match the phonetic representation of the word 'CELL' in the phonetic lattice against a sequence of phonemes located at a first audio content index starting location within the audio content index. If the match of the word 'CELL' receives a score above a predetermined threshold, the phoneme matching and scoring algorithm can automatically match the phonetic representation of the word 'TECHNOLOGY' against the sequence of phonemes in the audio content index which immediately follow the sequence of phonemes used to match the phonetic representation of the word 'CELL.' The phoneme matching and scoring algorithm can also automatically match the phonetic representation of the word 'FUEL' against the sequence of phonemes in the audio content index which immediately precede the sequence of phonemes used to match the phonetic representation of the word 'CELL.' If the match of the word 'CELL' receives a score below the predetermined threshold, the phoneme matching and scoring algorithm can automatically abort the matching process at the first audio content index starting location and move onto a second audio content index starting location. Alternatively, the phoneme matching and scoring algorithm can perform a matching operation for every word in the search query at each audio content index starting location regardless of scores assigned to already matched words. If a match of the word 'FUEL' is implemented and the match receives a score above the predetermined threshold, the phoneme matching and scoring algorithm can automatically match the phonetic representation of the word 'EFFICIENT' against the sequence of phonemes in the audio content index which immediately precede the sequence of phonemes used to match the phonetic representation of the word 'FUEL.' If the match of the word 'FUEL' receives a score below the predetermined threshold, the phoneme matching and scoring algorithm can automatically abort the matching process at the first audio content index starting location and move on to a second audio content index starting location.

In another exemplary embodiment, the composite score of a match can be used by the phoneme matching and scoring algorithm to determine a prioritized order for remaining comparisons. In this case, the system can perform a heuristic comparison. A heuristic comparison is a search method in which, rather than trying all possible search paths, the system focuses on paths that appear to be the most promising as determined by an evaluation formula. A heuristic comparison can be applied such that the most relevant comparisons are completed prior to those that are considered less relevant by order of the applied phoneme insertion, substitution, and deletion penalties described above.

In an exemplary embodiment, the system can implement the phoneme matching and scoring algorithm in a parallel fashion for optimal performance. For example, the phoneme matching and scoring algorithm can be implemented as multi-threaded software code and/or run on a multi-core or multi-processor computer. Each thread within the multi-threaded software can process a distinct audio content time segment such that a plurality of audio content time segments can be simultaneously searched. The threads can retrieve the audio content time segments from a multi-array lookup table or other data structure which includes a list of audio content time segments and continue the processing and retrieval until every audio content time segment has been searched.

In an operation 615, the system generates a list of audio content search results. In an exemplary embodiment, the list of audio content search results can include information regarding the audio content time segment in which each audio content search result is located, the location of each audio content search result within the audio content time segment, timestamp(s) corresponding to each audio content search result, and/or score(s) assigned to each audio content search result by the phoneme matching and scoring algorithm. In one embodiment, the audio content search results can be sorted by time to determine if any results are within a minimum time period of one another. If two results are within the minimum time period of each other, the result with the lower score can be discarded.

Each audio content search result can be an individual search result based on the comparison of a single word or phrase from the search query to the audio content index. If the search query includes a plurality of words and/or phrases, it can be difficult to determine the overall relevance of any given audio content time segment based on the fragmented audio content search results. To generate an overall relevance score for each audio content time segment, the system can combine and compile the audio content search results. In an exemplary embodiment, the system can compile audio content search results separately for each audio content time segment. As a result, the system can perform results compilation for a plurality of audio content time segments in parallel.

In an operation 620, valid sequences of the audio content search results are generated by the system. In an exemplary embodiment, a valid sequence can refer to any sequence of audio content search results which complies with predetermined sequence rules. A valid sequence can include any number of audio content search results. In an exemplary embodiment, the valid sequence includes anywhere from one to z audio content search results, where z is the number of words/phrases within the search query. Once generated, each valid sequence can be receive a score based on the individual scores of matches within the valid sequence and/or the exactness of the valid sequence to the search query.

In an exemplary embodiment, each audio content search result within the list of audio content search results can be used as a starting location for creating the valid sequences. For example, once the system generates every possible valid sequence utilizing a first audio content search result as a starting location, the system can generate every possible valid sequence utilizing a second audio content search result as the starting location, and so on. As a result, a given audio content search result can be included in a plurality of valid sequences. In an exemplary embodiment, the first audio content search result can be the audio content search result with the earliest timestamp, the second audio content search result can be the audio content search result with the second earliest timestamp, and so on. Alternatively, the system can proceed in any other order to generate the valid sequences.

A plurality of predetermined sequence rules can be used to identify valid sequences. For example, the system can require that the order of occurrence of the audio content search results obtained from the audio content index match the order of words/phrases in the search query. In one embodiment, the order of occurrence rule may be implemented only when forming valid sequences which correspond to a quoted search query. Alternatively, the order of occurrence rule can be enforced when forming a valid sequence corresponding to any search query. The system can also require that audio content search results which correspond to consecutive words/phrases in the search query occur within a predetermined time threshold of one another. In an exemplary embodiment, the predetermined time threshold can be two hundred milliseconds (ms). Alternatively, any other predetermined time threshold can be used. In one embodiment, the system can require that there are no missing words in valid sequences which correspond to quoted search phrases. The system can also require that the audio content index does not include additional words in between the words of a quoted search phrase. For example, if the search query is 'one "two three" four,' the audio content search results 'one two four' may not form a valid sequence. Similarly, the audio content search results 'one two three four' may not form a valid sequence if the audio content index includes an additional word or words in between two and three. In an alternative embodiment, fewer, additional, and/or different rules can be used to generate valid sequences based on the audio content search results.

As an example, FIG. 8 is a table illustrating audio content search results obtained from a comparison of the search query "THE QUICK BROWN FOX" to an audio content index in accordance with an exemplary embodiment. In an exemplary embodiment, the system can iteratively form valid sequences using each audio content search result as a starting location. As an example, the system can start with the audio content search result 'BROWN' (at zero ms) because it has the earliest timestamp of the audio content search results. Alternatively, the system use any of the other audio content search results as an initial starting location. In an exemplary embodiment, the valid sequence 'BROWN' is the only valid sequence which can be formed using the audio content search result 'BROWN' (at zero ms). For example, the audio content search result 'BROWN' (at zero ms) and the audio content search result 'THE' (at fifty ms) may not form a valid sequence because 'THE' occurs before 'BROWN' in the search query and the timestamps indicate that 'THE' occurs after 'BROWN' in the audio content index. Similarly, 'BROWN' (at zero ms) and 'FOX' (at three hundred fifty ms)

may not form a valid sequence because they are consecutive words which are more than two hundred ms apart.

Once the system generates every possible valid sequence which includes the audio content search result 'BROWN' (at zero ms), the system can generate possible valid sequences for the audio content search result 'THE' (at fifty ms). The audio content search result 'THE' (at fifty ms) can be a valid sequence. The audio content search results 'THE' (at fifty ms)+'QUICK' (at one hundred ms) can form another valid sequence. The audio content search results 'THE' (at fifty ms)+'QUICK' (at one hundred ms)+'BROWN' (at 200 ms) can form another valid sequence. Similarly, the audio content search results 'THE' (at fifty ms)+'QUICK' (at one hundred ms)+'BROWN' (at 200 ms)+'FOX' (at three hundred fifty ms) can form another valid sequence. However, the audio content search result 'THE' (at fifty ms) and the audio content search result 'QUICK' (at three hundred ms) may not form a valid sequence because they correspond to consecutive words in the search query and occur more than the predetermined time threshold of two hundred ms from one another. Once the system generates every valid sequence for using the audio content search result 'THE' as a starting location, the system can generate valid sequences using the audio content search result 'QUICK' (at one hundred ms) as a starting location, and so on. In an exemplary embodiment, the system can ensure that duplicate valid sequences are not generated during the valid sequence generation process.

In an alternative example, the audio content search result 'THE' (at fifty ms) and the audio content search result 'FOX' (at three hundred fifty ms) may be the only audio content search results generated during the phoneme matching and scoring process. These audio content search results are three hundred ms apart from one another. However, the audio content search results 'THE' (at fifty ms) and 'FOX' (at three hundred fifty ms) may still form a valid sequence because they do not correspond to consecutive words in the search query. There are two missing words ('QUICK' and 'BROWN'), each of which can account for approximately two hundred ms. Therefore, the system may require only that the audio content search results 'THE' and 'FOX' need to occur within six hundred ms of each other.

Referring back to FIG. 6, the valid sequences of audio content search results are scored in an operation 625. In an exemplary embodiment, the score can be based in part on the audio content search result score for each of the audio content search results included in the valid sequence. In another exemplary embodiment, the system can assign a penalty for each word and/or phrase included in the search query which is not represented in the valid sequence. In an exemplary embodiment, the missing word penalty can be negative five. Alternatively, the missing word penalty can be equivalent to the penalty which would have been assigned during the phoneme matching process for deleting each of the phonemes in the missing word. Thus, if a deleted phoneme was assigned a penalty of negative one by the phoneme matching and scoring algorithm, and the missing word has four phonemes, the missing word penalty can be negative four. In another alternative embodiment, any other penalty value can be used for missing words/phrases. As a scoring example, using the audio content search results from the table in FIG. 8, the following valid sequence can be obtained: 'THE' (at fifty ms)+'QUICK' (at one hundred ms)+'BROWN' (at two hundred ms)+'FOX' (at three hundred fifty ms). Each of the audio content search results has an individual matching score of zero and the valid sequence represents each of the words in the search query. Thus, there is no missing word/phrase penalty, and the valid sequence can receive a total score of zero.

Another valid sequence which can be formed using the audio content search results from FIG. 8 is 'THE' (at fifty ms)+'QUICK' (at one hundred ms)+'BROWN' (at two hundred ms). Again, each of these audio content search results has an individual match score of zero. However, the valid sequence can receive a score of negative five because the word 'FOX' is missing. The valid sequence which includes 'QUICK' (at three hundred ms)+'FOX' (at three hundred fifty ms) can receive a total score of negative eleven because two words are missing and the audio content search result 'QUICK' received a score of negative one during the phoneme matching and scoring process. The valid sequence which includes only the word 'QUICK' (at three hundred ms) can receive a score of negative sixteen because three words are missing and the audio content search result 'QUICK' previously received a score of negative one. In an exemplary embodiment, the system can assign a score to each generated valid sequence.

In an operation 630, the system culls the generated valid sequences to ensure that only the best valid sequences are used. For example, the system can ensure that each audio content search result is included in only one valid sequence. The system can identify every valid sequence in which a given audio content search result occurs and keep only the valid sequence with the highest score. In an exemplary embodiment, the system can use audio content search results in the valid sequence with the highest score as a starting point for eliminating overlapping valid sequences. Once valid sequences are eliminated based on the valid sequence with the highest score, the system can use a remaining valid sequence with the next highest score to eliminate additional overlapping valid sequences, and so on until each audio content search result is included in only one valid sequence. The system can also compare valid sequences which occur within a predetermined time period of one another and discard the valid sequence with the lower score. The predetermined time period can be any time period. In an alternative embodiment, the system may also eliminate valid sequences which have a total score that falls below a predetermined threshold. In an operation 635, a list of valid sequences is generated. In an exemplary embodiment, the list of valid sequences can include every valid sequence which was not eliminated during the culling process. In an alternative embodiment, the valid sequences may not be culled, and the list of valid sequences can include every possible valid sequence.

In an operation 640, the system calculates a confidence score for each valid sequence in the list of valid sequences. In an exemplary embodiment, a confidence score can be any score capable of indicating the likelihood that a given valid sequence is a true occurrence of the search query within the audio content and not a false positive. Confidence scores can be used to sort audio content time segments by relevance and/or to compare audio content search results with individual textual content search results and/or individual visual content search results. Confidence scores can also be used by users of the system. For example, the user can set a confidence score threshold such that only audio content time segments which include at least one valid sequence with a confidence score above the threshold are presented to the user. In an alternative embodiment, a confidence score can also be determined for each individual word/phrase within each valid sequence.

In an exemplary embodiment, the confidence score can be calculated using a mathematical scoring function derived from a statistical model training process. The mathematical scoring function can take match percentage score(s), the number of words in the search query, the number of phonemes in the search query, and a phonetic uniqueness score of the search query as inputs. The match percentage score can be calculated using a total penalty score which is based on a sum of the score(s) assigned to each match during the phoneme matching and scoring process and the score(s) assigned for missing words/phrases during the valid sequence generation process. In an exemplary embodiment, the total penalty score can be the score determined in the operation 625. For example, a search query can include three words and a valid sequence can include two audio content search results corresponding to two words. The missing word penalty can be negative five. A sum of the scores assigned to the first audio content search result in the valid sequence during the forward and backward matches can be negative three, and a sum of the forward and backward matching scores assigned to the second audio content search result in the valid sequence can be negative two. The total penalty score for the valid sequence can be negative ten.

Each total penalty score can be converted into the match percentage score using Equation 3 below in which the max possible penalty score can be the lowest possible total penalty score which could have been assigned to the valid sequence. For example, a search query can include four words, a valid sequence can include three audio content search results corresponding to three words, the penalty for missing words can be negative five, and the worst allowable score given to matches during the phoneme matching and scoring process can be negative six. The max possible penalty score can be negative thirty-three based on three missing words (negative fifteen) and three matches which could have potentially scored negative six each (negative eighteen). Alternatively, the max possible penalty score can be negative thirty-nine based on three missing words and four matches scored at negative six each. Alternatively, the max possible penalty score can be negative thirty-eight or negative forty-four based on four missing words and three or four matches scored at negative six each. In another alternative embodiment, each match can have its own worst allowable score based on the number of phonemes within the word being matched or other factors, and/or each potential missing word/phrase can have its own distinct missing word/phrase penalty based on the number of phonemes in the missing word/phrase or other factors.

$$\text{Match Percentage Score} = \frac{Total\_Penalty\_Score}{Max\_Possible\_Penalty\_Score} * 100 \quad \text{Equation 3}$$

A second input into the mathematical scoring function can simply be the number of words/phrases which are actually included within the search query. The mathematical scoring function can also take the number of phonemes included in the search query as an input. If the phonetic lattice of the search query includes a single pronunciation of the search query, the number of phonemes can simply be the total number of phonemes included in the search query. If there are multiple possible pronunciations of the search query, the number of phonemes can be the minimum possible number of phonemes, the maximum possible number of phonemes, or an average number of phonemes based on the pronunciations.

The phonetic uniqueness score of the search query can also be an input to the mathematical scoring function. In an exemplary embodiment, the phonetic uniqueness score can be used to quantify the reliability of a given match percentage score. The phonetic uniqueness score, which can be based on the probability of occurrence of each bi-phoneme (or bi-phoneme probability) in the search query, can be a measure of the likelihood that the words/phrases of the search query are being confused with other words/phrases. The bi-phoneme probability of a bi-phoneme can be calculated by dividing the number of occurrences of the bi-phoneme in an experimental corpus of speech recognition data by the total number bi-phones uttered in the corpus. In an exemplary embodiment, the phonetic uniqueness score can be obtained by taking the opposite of the natural log of the product of the bi-phoneme probabilities corresponding to the phonemes of the search query. This relationship is illustrated with reference to Equation 4 below in which $bpp_1$ is the bi-phoneme probability of the first bi-phoneme in the search query, $bpp_2$ is the bi-phoneme probability of the second bi-phoneme in the search query, and $bpp_j$ is the bi-phoneme probability of the last bi-phoneme in the search query. If the phonetic lattice corresponding to the search query includes multiple pronunciations, a phonetic uniqueness score for each possible path through the phonetic lattice can be calculated and used by the mathematical scoring function. Alternatively, the phonetic uniqueness score can be the lowest possible phonetic uniqueness score, the highest possible phonetic uniqueness score, or an average phonetic uniqueness score based each path through the phonetic lattice.

$$\text{Phonetic Uniqueness Score} = -\ln(bpp_1 * bpp_2 * \ldots * bpp_j) \quad \text{Equation 4}$$

In an exemplary embodiment, the confidence score can reflect the likelihood that a valid sequence is a true occurrence of the search query. The confidence score can be calculated using a curve fitting function and an observed trend from a language corpora. Curve fitting generally refers to finding a mathematical function which matches a series of data points.

In an exemplary embodiment, the mathematical function can be a sigmoid2D function, illustrated as Equation 5 below, and can include a matrix of coefficients. Each cell in the matrix of coefficients can be addressed based on the number of words in the search query, the number of phonemes in the search query, and the phonetic uniqueness score of the search query. Each cell can contain a set of empirically derived values for the coefficients A, B, and C in the sigmoid2D function. The coefficients can be determined by fitting a set of training data based on a language corpus to the sigmoid2d function. A language corpus can be a body of text used to do statistical analysis, including checking word/phoneme occurrences. For any given search query, the values of A, B, and C can be looked up from the appropriate cell and the confidence score can be calculated using Equation 5, in which mpg is the match percentage score. In alternative embodiments, the confidence score of the valid sequences can be calculated using any other confidence score calculation method known to those of skill in the art.

$$\text{Confidence Score} = \frac{A}{1 + e^{\frac{-(mpg-B)}{C}}} \quad \text{Equation 5}$$

In an operation 650, the system generates an ordered list of audio content search results. In an exemplary embodiment, the system can generate the ordered list of audio content search results using relevance values calculated by a mathematical formula. The mathematical formula can be a score summation formula capable of being used to sum confidence or match scores. The score summation formula can also include an exponential power factor capable of being applied to the confidence or match scores.

Equation 6 below can be used to calculate relevance values of the audio content search results. In Equation 6, $R_P$ can be a relevance score of an audio content time segment, W can be a weighting factor ranging from 0 to 1, $S_k$ can be a score associated with the $k^{th}$ result of the time segment, n can be the total number of search results sets, and P can be a power parameter. The series of scores ($S_1$, $S_2$, ... $S_k$) can be provided in descending order such that $S_1$ is the highest score and $S_n$ is the lowest score). The power parameter P can be an affinely extended real number which can be varied to lessen or increase the impact of the highest individual search result score for a given individual time segment.

$$R_P(S_1, S_2, \ldots, S_n) = \left(\sum_{k=1}^{n} W^{K-1} S_k^P \times (1-W)\right)^{1/P} \quad \text{Equation 6}$$

As an example, an audio time segment X can have match scores of 100, 90, 80, and W can equal 0.3. With a value of P=1, an overall relevance value for audio time segment X can be $((0.3^0 \times 100^1 + 0.3^1 \times 90^1 + 0.3^2 \times 80^1) \times (1-0.3))^{1/1} = 93.9$. With a value of P=5, an overall relevance value for audio time segment X can be $((0.3^0 \times 100^5 + 0.3^1 \times 90^5 0.3^2 \times 80^5) \times (1-0.3))^{1/5} = 96.7$. With a value of P=20, an overall relevance value for audio time segment X can be $((0.3^0 \times 100^{20} + 0.3^1 \times 90^{20} + 0.3^2 \times 80^{20}) \times (1-0.3))^{1/20} = 98.4$.

It can be seen that as P increases, the relevance score becomes more biased toward the highest match score in the set, which can be advantageous if the given match scores do not accurately reflect relevance. For example, a single match score of 100 may represent a perfect match of the query "heart attack", while a score of 50 may represent a match (based on the percentage of words found) of only the word "attack". In this case, the match scores do not accurately reflect the relevance difference because a "heart attack" match is considerably more relevant than two matches of "attack" because "attack" alone has a different meaning than "heart attack". Therefore, a time segment relevance score calculation with a bias toward the highest match scores can be desirable.

As another example, the value of W in Equation 6 can be varied for an audio content time segment Y with match scores of 100, 100, 90, and P=5. For W=0.3, an overall relevance value for audio time segment Y can be $((0.30 \times 100^5 + 0.31 \times 100^5 + 0.32 \times 90^5) \times (1-0.3))^{1/5} = 98.9$. With a value of W=0.7, an overall relevance value for audio time segment Y can be $((0.70 \times 100^5 + 0.71 \times 100^5 + 0.72 \times 90^5) \times (1-0.7))^{1/5} = 90.2$.

It can be seen that values of W closer to 0 give more weight to the first (and thus highest) input match score and less weight to subsequent inputs. Values of W closer to 1 give more weight to more of the inputs. Thus values of W can be chosen to tailor the ranking function for the relevance characteristics of particular content types. For example, multiple high scoring results in an audio content type tend to suggest higher relevance because the search term(s) is repeated and/or the audio search system is more confident from an accuracy standpoint because there are multiple supporting results. In this case, values of W closer to 1 would generally be beneficial in the relevance calculation. In contrast, multiple high scoring results in a visual content type may simply be an indication of repetitive information that doesn't necessarily make the time segment more relevant. In this case, values of W closer to 0 may be more appropriate.

In an exemplary embodiment, preferential treatment can be given to audio content time segments that contain more of the different terms in a multi-word query than time segments that have higher counts of less of the search terms. For example, a query for "little brown puppy" may yield two time segments. Time segment S may contain an occurrence of the term "little" and an occurrence of the term "puppy", while time segment T contains three occurrences of the term "little." In this case, it may be desirable to rank time segment S ahead of time segment T because it contains more of the different terms of the query, even though time segment S contains fewer overall results than time segment T.

In an alternative embodiment, the system can generate the ordered list of audio content search results by creating one or more relevance strings for each audio content time segment from which a valid sequence was located. Relevance can be determined by giving each audio content time segment an overall indicator of relevance and sorting segments based on the indicator. Relevance can also be determined by sorting results within each audio content time segment by their confidences scores and/or sorting results from all audio content time segments by their confidence scores. The relevance string can be a numeric string used to represent the relevance of an audio content time segment and based on several ranked criteria. In an exemplary embodiment, the highest ranked criterion can be based on the number of conjunctive results located within the audio content time segment. A conjunction, or 'and' operator, can be used by the user to indicate that returned search results should include a plurality of words/phrases. For example, in the search query 'DOG and CAT and MOUSE,' there are two 'and' operators and three desired words (or conjuncts). An audio content time segment which includes all three conjuncts can include a rank of 03, an audio content time segment which includes only two of the conjuncts can include a rank of 02, and an audio content time segment which includes only one of the conjuncts can include a rank of 01. In an exemplary embodiment, each valid sequence can correspond to one conjunct within the search query. In another exemplary embodiment, search queries which do not include a conjunction can be treated as containing a single conjunct.

A second criterion for generating the relevance string can be a ranking based on the confidence scores of the conjuncts (or valid sequences) within each audio content time segment. The highest confidence score for each conjunct in an audio content time segment and the number of occurrences of that confidence score can be appended to the relevance string following the number of conjunctive results. In an exemplary embodiment, the confidence scores can be appended in decreasing order from highest score to lowest. For example, an audio content time segment can include four valid sequences corresponding to the conjunct 'MOUSE,' and the confidence scores associated with the valid sequences can be ninety, ninety, eighty, and sixty. The audio content time segment can also include two valid sequences corresponding to the conjunct 'DOG,' and the confidence scores of the valid sequences can be eighty-five and seventy. The audio content time segment may contain no valid sequences corresponding to the conjunct 'CAT.' In an exemplary embodiment, the conjunct with the highest confidence score is 'MOUSE' with two confidence scores of ninety. The conjunct with the next highest confidence score is 'DOG' with a single confidence score of eighty-five. Thus, a partial relevance string for this particular audio content time segment can be 02-090,02,085, 01,000,00. The first '02' can be the number of conjuncts present in the audio content time segment, the dash can be to separate criteria, the '090' can be the overall highest confidence score of any of the conjuncts, the second '02' can be the number of occurrences of the highest confidence score, the '085' can be the highest confidence score not associated with the conjunct that had the overall highest confidence score, and the '01' can be the number of occurrences of '085.' The zeros can be used as fillers to ensure that every relevance string is uniform in size. In an exemplary embodiment, if the highest overall confidence score is associated with two or more different conjuncts, the conjunct with the higher number of occurrences of that score can be placed first in the relevance string. For example, if two valid sequences corresponding to the conjunct 'MOUSE' have confidence scores of ninety, one valid sequence corresponding to the conjunct 'DOG' has a confidence score of ninety, and ninety is the highest overall confidence score, the values associated with 'MOUSE' can be placed first in the relevance string.

The confidence scores and the number of their occurrences can also be used as a third criterion for generating the relevance string. In an exemplary embodiment, the third criterion can be a ranking based on all of confidence scores within the audio content time segment and their number of occurrences. For example, the audio content time segment can include three valid sequences corresponding to 'DOG' with confidence scores of ninety, ninety, and seventy, two valid sequences corresponding to 'CAT' with confidence scores of ninety and fifty, and one valid sequence corresponding to 'MOUSE' with a confidence score of seventy. In an exemplary embodiment, the relevance string for this particular audio content time segment can be 03-090,02,090,01,070,01-090,03,070,02,050,01. The data corresponding to the third criterion can follow the second dash of the relevance string. In this data, the '090' can be the highest overall score out of all the confidence scores associated with the audio content time segment, the '03' can be the number of occurrences of '090,' the '070' can be the second highest overall confidence score, the '02' can be the number of occurrences of '070,' the '050' can be the third highest overall confidence score, and the '01' can be the number of occurrences of '050.' In one embodiment, every confidence score associated with the audio content time segment and its number of occurrences can be included in the relevance string. Alternatively, only the top one, two, three, four, five, etc. confidence scores and their number of occurrences can be included in the confidence string. In another alternative embodiment, a confidence score threshold can be used to determine which confidence scores to include in the relevance string. In another alternative embodiment, fewer, additional, or different criteria can be used to generate the relevance string. In yet another alternative embodiment, the relevance string can be generated in any format capable of conveying the relevance of an audio content time segment. In one embodiment, the data in the relevance string can be placed in any other order. For example, the data corresponding to the second criterion can be placed first, the data corresponding to the third criterion can be placed first, etc.

In an exemplary embodiment, the relevance string for each audio content time segment can be used as a numeric sorting key to rank the audio content time segments and generate the ordered list. The audio content time segments can first be numerically sorted and ranked by the first criterion. If there are ties using the first criterion, the audio content time segments can be numerically sorted and ranked by the second criterion, and so on. As an example, audio content time segments A, B, and C can each include valid sequences which are at least partially relevant to the search query 'DOG and CAT and MOUSE.' Audio content time segment A can include one valid sequence corresponding to the conjunct 'DOG' (confidence score of eighty), one valid sequence corresponding to the conjunct 'CAT' (confidence score of seventy), and two valid sequences corresponding to the conjunct 'MOUSE' (confidence scores of ninety and sixty). Using the criteria described above, the relevance string for audio content time segment A can be 03-090,01,080,01,070,01-090,01,080,01,070,01,060,01.

Audio content time segment B can include one valid sequence corresponding to the conjunct 'CAT' (confidence score of one hundred) and one valid sequence corresponding to the conjunct 'MOUSE' (confidence score of one hundred). Using the criteria described above, the relevance string for audio content time segment B can be 02-100,01,100,01,000, 00-100,02,000,00,000,00,000,00. Audio content time segment C can include one valid sequence corresponding to the conjunct 'DOG' (confidence score of thirty), two valid sequences corresponding to the conjunct 'CAT' (confidence scores of thirty and thirty), and one valid sequence corresponding to the conjunct 'MOUSE' (confidence score of thirty). Using the criteria described above, the relevance string for audio content time segment C can be 03-030,02, 030,01,030,01-030,04,000,00,000,00,000,00.

In an exemplary embodiment, the relevance strings can be used to rank audio content time segments A, B, and C. Based on the first criterion, which is the number of conjuncts present in the audio content time segment, audio content time segments A and C are tied for first place with a value of 03, and audio content time segment B is alone in second place with a value of 02. Because of the tie, the second criterion, and if necessary the third criterion, can be used as a tie breaker. The first value based on the second criterion for audio content time segment A is '090,' and the first value for audio content time segment C is '030.' Because '090' is larger than '030,' audio content time segment A is ranked ahead of audio content time segment C. Thus, in this example, the ranking of the audio content time segments based on relevance to the search query can be audio content time segment A, followed by audio content time segment C, followed by audio content time segment B. If both audio content time segments A and C had a first value of '090' after the first dash, then the second value based on the second criterion can be used to break the tie, and so on until each of the values based on the second criterion has been used. If there is still a tie after using all six values based on the second criterion, the first value based on the third criterion can be used, and so on until the tie is broken.

In an operation 655, the system can provide the ordered list of audio content search results to a search results fusion engine. In an exemplary embodiment, a predetermined number of audio content search results can be provided to the search results fusion engine. For example, the top fifty or the top one hundred audio content time segments can be provided. The predetermined number can be established by the system or set as a search criterion by the user. In another exemplary embodiment, the number of valid sequences provided within each provided audio content time segment can be limited to a predetermined or user-specified number. For example, the top ten or the top twenty-five valid sequences can be identified for each provided audio content time segment. In an alternative embodiment, a predetermined or user-specified number of valid sequences can be provided independent of the audio content time segment in which the valid sequence occurs. For example, the top fifty or the top one hundred valid sequences can be provided even if they all occur in only one or a few audio content time segments. The search results fusion engine can combine the audio search results along with textual metadata content search results and/or visual content search results such that a set of final search results can be generated and presented to the user.

Figure 9:
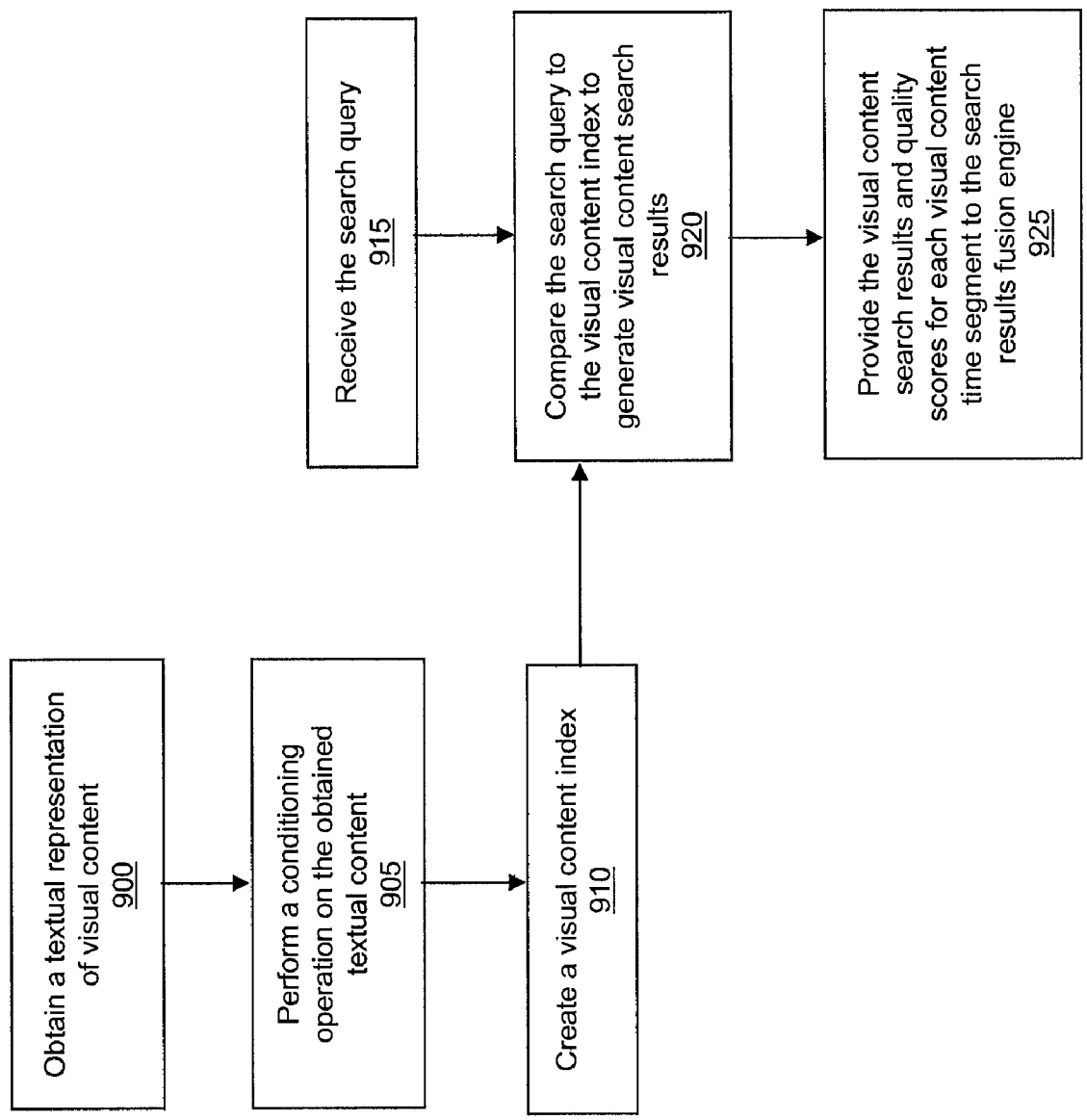
FIG. 9 is a flow diagram illustrating operations performed during a visual content search process in accordance with an exemplary embodiment.

FIG. 9 is a flow diagram illustrating operations performed during a visual content search process in accordance with an exemplary embodiment. Additional, fewer, or different operations may be performed in alternative embodiments. In an operation 900, a representation of the visual content is obtained. The representation can be a textual representation which is obtained through the use of an optical character recognition (OCR) algorithm. In an exemplary embodiment, OCR can be performed on each image frame of the visual content. Alternatively, OCR can be performed on a subset of image frames. The OCR can be used to detect regions in a video image frame in which text is present and also to recognize characters, words, symbols, and any other textual content within each detected region. Optical character recognition can be applied to photographic images with in-image or overlaid textual content. Examples of such textual content can be images of photographs which show signs, banners, etc., images which include closed captioning text, images of broadcast news video which contain headlines in the background or scrolling text on the bottom of the image, etc. Optical character recognition can also be applied to data captured from electronic whiteboards and computer generated graphics such as slides used during a presentation. The information obtained during the OCR process can be hypotheses of detected textual content, alternate textual content choices, confidence scores associated with the hypotheses, information about the location, size, and/or font of the textual content within image frames, the timestamp and/or time duration during which the visual content was presented, and/or other information associated with the visual content.

In an exemplary embodiment, video image frames with the same textual content can be grouped together prior to or after extraction of textual content. For example, a presenter using a slide presentation and no other textual content may use a single slide for several seconds or several minutes. If the visual content is implemented as video, it may show the same slide thirty frames per second. Thus, for purposes of a textual representation, many image frames may be duplicative. The duplicative image frames can be grouped together using a duplicate frame detection algorithm such that the OCR process captures the textual representation a single time. The duplicate frame detection algorithm can measure the similarity between consecutive images at the pixel level. Alternatively, the image frames can be grouped together after the OCR process is performed by comparing the extracted textual representation and the aforementioned information about the textual representation from consecutive image frames. Image frames can also be grouped to provide a time duration during which given textual content was presented. The time duration can be used by the search results fusion engine to help fuse the visual content search results with the audio content search results and textual content search results.

In alternative embodiments, a representation of the visual content can be obtained using object recognition or face recognition. Object recognition refers to a method that can identify objects from visual content. Objects can include items like a truck, person, coffee cup, pie chart, a spreadsheet table, etc. Recognized objects can have a textual representation. For example, the textual representation of a truck may be simply 'truck'. Some object recognition methods may distinguish greater details and thus produce a better textual representation. For example, an object recognition method may produce a textual representation such as 'red Ford pickup truck' instead of 'truck'. Face recognition can refer to a method that can identify face from visual content. In this case, the identified person's name can become the textual representation. Object and/or face can be implemented using any methods known to those of skill in the art.

Alternatively, a textual representation of the visual content can be extracted from software application files that are the basis for the visual content. Software application files can include Microsoft PowerPoint files, Microsoft Word files, etc. When such files are available, it can be advantageous to extract the textual representation directly from them, as opposed to extracting the textual representation using OCR or other method that may introduce errors.

Alternatively, a textual representation of the visual content can be extracted from formatted text that is the basis for the visual content. Examples of formatted text can include HTML files and XML files. When such files are available, it can be advantageous to extract the textual representation directly from them, as opposed to extracting the textual representation using OCR or other method that may introduce errors.

In an operation 905, a textual content conditioning operation is performed on the extracted textual content. The textual content conditioning operation can include a markup removal operation in which any extraneous text, hyper-text markup language (HTML), XML tags, etc. can be removed from the textual content. The textual content conditioning operation can also include a tokenization operation in which the textual content can be separated into units such as words. The tokenization operation can be based on word boundary rules for a particular language. For example, in English, space between groups of characters is generally indicative of a word boundary. For text extracted via an OCR or other processes that may produce errors, words can be validated through a dictionary lookup, methods that eliminate words containing invalid characters or character sequences, or other word validation techniques known to those of skill in the art. A stemming operation can be performed on tokens identified during the tokenization operation. The stemming operation can be used to identify the word stems of the tokens. In an exemplary embodiment, the system can compare words from the search query to the word stems to locate potentially relevant textual content.

A normalization operation can also be performed on the textual content. The normalization operation can be used to adjust dates, numbers, acronyms, etc. such that they are consistent within the textual content. For example, all dates included within the textual content can be converted into a 00/00/0000 format. In an exemplary embodiment, textual content conditioning can also include performing a common token removal operation. The common token removal operation can be used to remove common words and/or characters such as 'or' from the textual content because common words may not be useful during a search. In alternative embodiments, any other textual content conditioning operations known to those of skill in the art can be performed on the textual content.

In an operation 910, a visual content index is created. The visual content index can include the tokens and/or word stems generated by the system during the textual content conditioning operation. In an exemplary embodiment, the visual content index can be in the form of an inverted index structure capable of storing each token along with a timestamp or range of timestamps during which the token was presented in the rich media presentation. In an alternative embodiment, the visual content index can be any other type of data structure known to those of skill in the art.

In an operation 915, the search query is received from a user. In an operation 920, the search query is compared to the visual content index to generate visual content search results. The comparison can be implemented by any method known to those of skill in the art for comparing a search query to textual content. This process can be repeated for every archived visual content time segment.

In an exemplary embodiment, a quality score can be determined for each visual content search result within each visual content time segment. In another exemplary embodiment, an overall quality score can be determined for each visual content time segment. The quality scores for visual content search results can be determined during the comparison of the search query to the visual content index. For example, an initial comparison can be implemented to locate starting locations of matching words within the visual content index. The starting locations can be used to perform a more detailed comparison to determine the exactness or quality of the match. The detailed comparison can be used to determine whether a word match is based on an actual token or a stem of the token. A match in which a word from the search query matches an actual token can receive a higher quality score than a word from the search query which matches a stem corresponding to a token. If the search query includes a plurality of words/phrases, the detailed comparison can compare timestamps or time durations of the matches of different words/phrases to determine whether the matches in the visual content index are in close proximity to one another. Matches of different words/phrases from the search query which are in close temporal proximity can receive a higher quality score than matches which are far apart. Timestamps or time durations can also be used to determine if matches in the visual content index are in the same order as the words/phrases in the search query. Matches which are in the same order as the search query can receive higher quality scores than out of order matches. In addition, the quality score can also be based wholly or in part on hypotheses, confidence scores, alternate word choices, and/or other information obtained during the OCR operation. In another exemplary embodiment, the quality scores of the visual content search results within each visual content time segment can be used to generate the overall relevancy score for that visual content time segment. In an exemplary embodiment, the overall relevancy score for a visual content time segment can be determined by the same method used to determine the overall relevancy score for audio content time segments.

In an operation 925, the visual content search results and quality scores for each visual content time segment are provided to the search results fusion engine. In an exemplary embodiment, only visual content search results and/or visual content time segments which have a quality score above a predetermined or user-specified value can be provided to the search results fusion engine. Alternatively, all of the identified visual content search results and/or visual content time segments can be provided.

Figure 10:
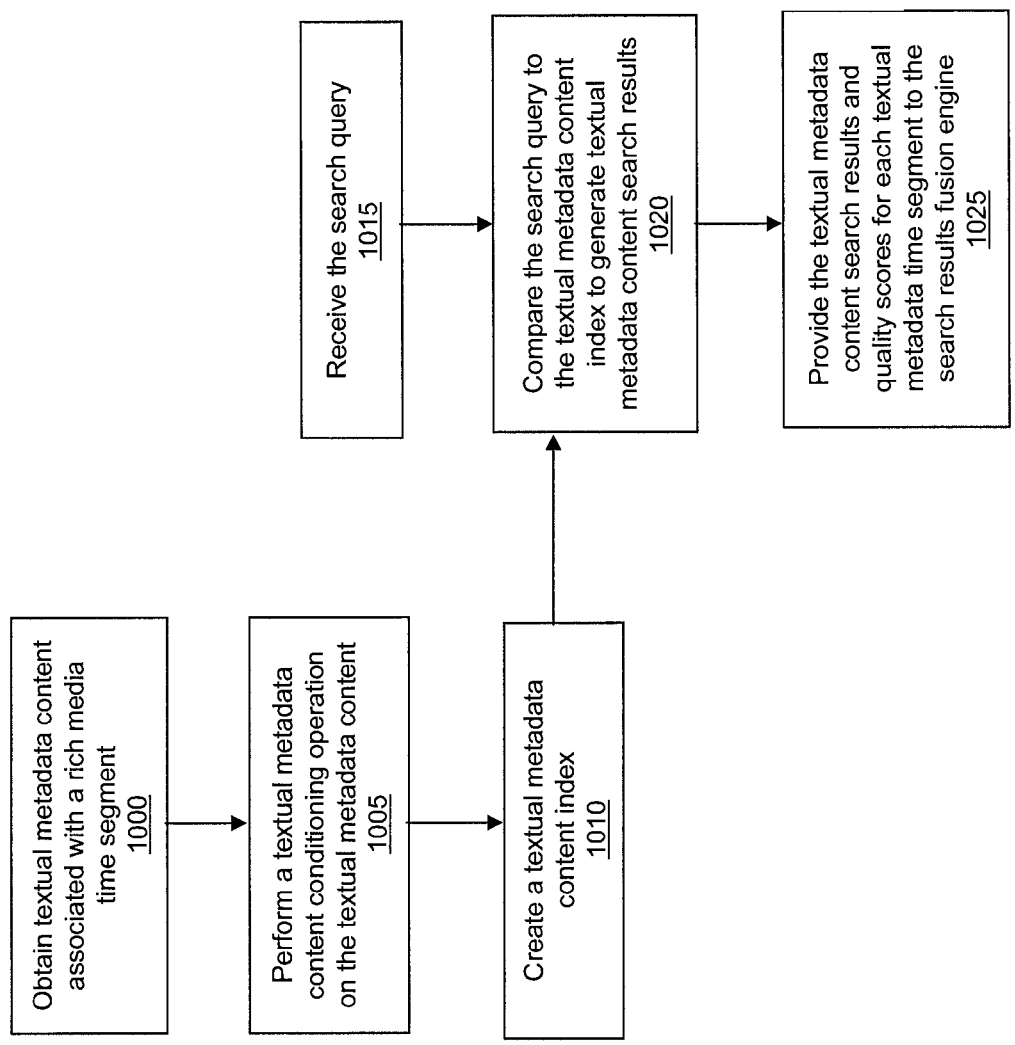
FIG. 10 is a flow diagram illustrating operations performed during a textual metadata content search process in accordance with an exemplary embodiment.

FIG. 10 is a flow diagram illustrating operations performed during a textual metadata content search process in accordance with an exemplary embodiment. Additional, fewer, or different operations may be performed in alternative embodiments. In an operation 1000, textual metadata content associated with a rich media presentation is obtained by the system. In an exemplary embodiment, the textual metadata content can include any metadata or data associated with the rich media presentation. For example, the textual metadata content can include a title of the rich media presentation, a name of the presenter of the rich media presentation, a sponsor of the rich media presentation, a date upon which the rich media presentation was given, an abstract of the rich media presentation, etc. The textual metadata content can also include notes, annotations, tags, etc. provided by a viewer of the rich media presentation. These various textual metadata content types can be separately maintained in the system to allow each type a different weighting factor in a fusion algorithm. For example, a result found in the title metadata of a presentation can be given a higher weighting factor than a result found in the description metadata of a presentation if it is determined that a result in a title is indicative of higher relevance.

The textual metadata content can be associated with an entire rich media presentation or any time segment of the rich media presentation such as a chapter. In an exemplary embodiment, the textual metadata content associated with a rich media presentation can be stored in one or more textual metadata content files which are accessible by the system. Alternatively, the textual metadata content associated with rich media presentations can be stored and/or accessed using any other method known to those of skill in the art.

In an operation 1005, a textual metadata content conditioning operation is performed on the textual metadata content. In an exemplary embodiment, the textual metadata content conditioning operation can be the same as the textual metadata content conditioning operation described with reference to FIG. 9. In an operation 1010, a textual metadata content index is created. The textual metadata content index can include information identifying the obtained textual metadata content and/or information identifying the location or source of the obtained textual metadata content. In an exemplary embodiment, the textual metadata content index can be an inverted index similar to the visual content index described with reference to FIG. 9.

In an operation 1015, the search query is received from a user. In an operation 1020, the search query is compared to the textual metadata content index to generate textual metadata content search results. In an exemplary embodiment, the comparison can be similar to the comparison described with reference to FIG. 9. In an exemplary embodiment, a quality score can be generated for each textual metadata content search result within each textual metadata content time segment. The quality score for textual metadata content search results can be based on any factors, including the location from which the textual metadata content search result was extracted and the type of textual metadata content For example, a textual metadata content search result corresponding to the title of the rich media presentation may receive a higher quality score than a textual metadata content search result obtained from a legal disclaimer concerning the rich media presentation. A relevance score can be created for each textual content time segment associated with a rich media presentation or portion of a rich media presentation. This can be accomplished as described in operation 650 discussed above for the relevancy calculation of audio content time segments, including the use of Equation 6. In an operation 1025, the textual metadata content search results and quality scores for each textual metadata content time segment are provided to the search results fusion engine.

Figure 11:
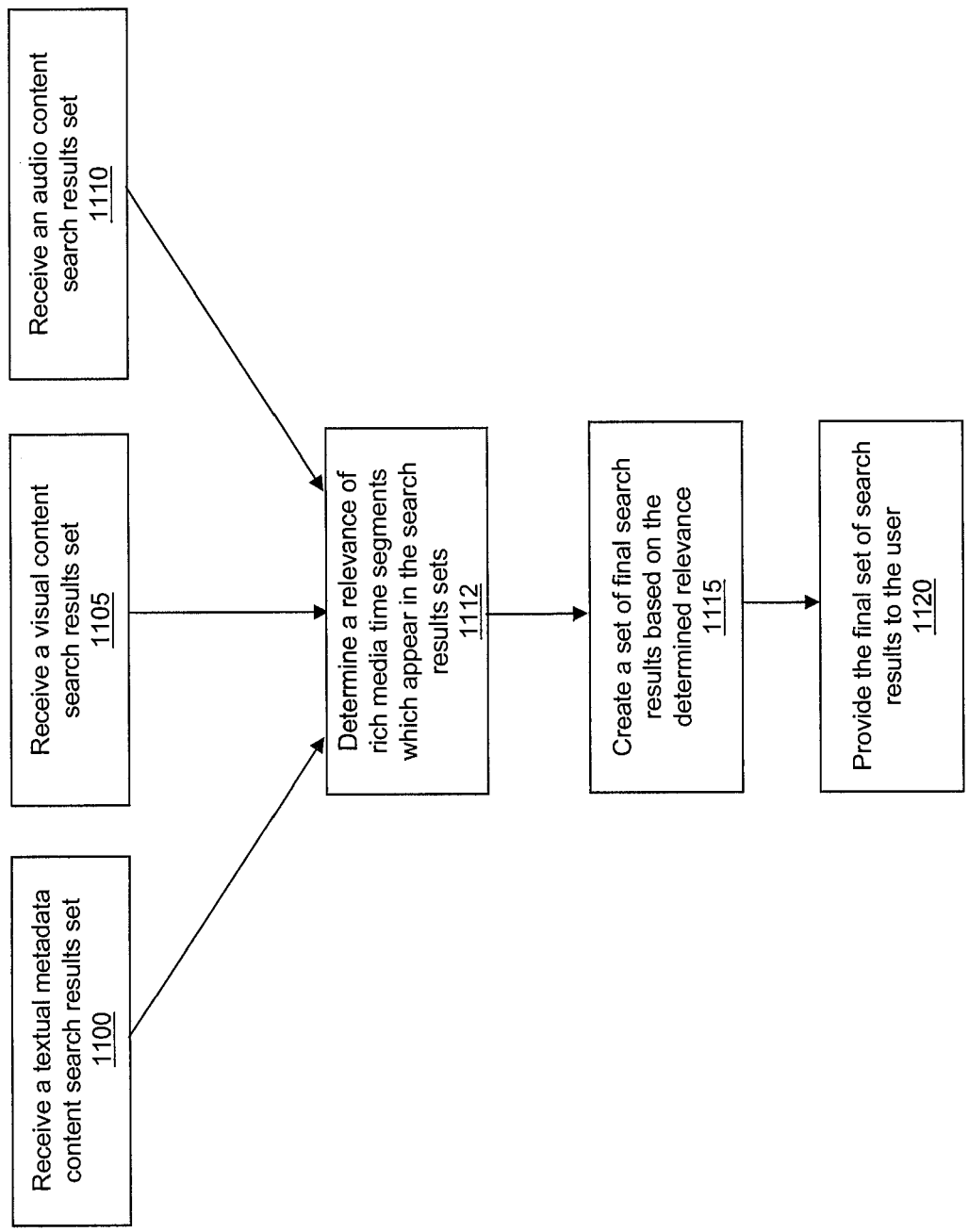
FIG. 11 is a flow diagram illustrating operations performed by a search results fusion engine in accordance with an exemplary embodiment.

FIG. 11 is a flow diagram illustrating operations performed during a search results fusion process in accordance with an exemplary embodiment. Additional, fewer, or different operations may be performed in alternative embodiments. In an exemplary embodiment, the system can use a search results fusion engine (or application) to analyze search result sets and generate a set of final search results. In an operation 1100, a textual metadata content search results set is received by the search results fusion engine by the search results fusion engine. The textual metadata content search results set can be generated by the system as described with reference to FIG.

10. Alternatively, the textual metadata content search results set can be obtained from an external source such as a standalone text-based search engine. In an operation 1105, a visual content search results set is received by the search results fusion engine. The visual content search results set can be generated by the system as described with reference to FIG. 9. Alternatively, the visual content search results set can be obtained from an external source such as a standalone visual search system. In an operation 1110, an audio content search results set is received by the search results fusion engine. The audio content search results set can be generated by the system as described with reference to FIGS. 2-8. Alternatively, the audio content search results set can be obtained from an external source such as a standalone audio search engine. In an exemplary embodiment, each individual search result in each set of received search results can have an assigned quality/match, confidence, or other score. For example, the audio content search results set may include ten individual audio content search results, each of which may have one or more scores associated with it. In another exemplary embodiment, each valid sequence within each individual audio content search result can have an assigned quality, confidence, relevance, or other score. Similarly, each textual metadata content search result within each individual textual metadata content search result and/or each visual content search result within each individual visual content search result can also have an assigned quality/match, confidence, or other score. In one embodiment, each set of received search results may be different in size. For example, there may be twelve textual metadata content search results and eighty-five audio content search results. Alternatively, each set of received search results can be the same size.

In an operation 1112, the search results fusion engine can determine a relevance of rich media time segments which include at least one individual search result from at least one result set type (textual metadata content results set, visual content results set, or audio content results set).

The relevance can be determined by an individual search result count, which is a sum of a number of individual audio content search results corresponding to the rich media time segment, a number of individual visual content search results corresponding to the rich media time segment, and/or a number of individual textual metadata content search results corresponding to the rich media time segment.

The relevance can also be influenced by result completeness. Match completeness of an individual search result can refer to the degree of exactness that the result matches the received search query. For example, a result may be an exact match with the search query. In another case, a result may be not be an exact match, but rather a stemmed version of the query word. For example, the result may be "sing" but the search query word was "sang". For multi-word search queries, the completeness can also refer to rich media time segments that have the most complete and ordered matches. For example, for a search query of "United States of America", a result that matches "United States" can be given a higher relevance than a result that just matches "United". Likewise, match completeness for multi-word queries can also refer to rich media time segments that have the most number of distinct terms. For example, for a query of "United States of America", a result that matches "United" and "States" in a rich media time segment can be given a higher relevance than a rich media time segment containing two results of the term "United". Match completeness of an individual result can be represented by a single match score, wherein the higher the match score the more complete the match.

The relevance can also be influenced by a confidence score associated with an individual search result. A confidence score can reflect the probability that an individual search result is an accurate match. This can be useful for those search results that are based on inaccurate processes such as optical character recognition or automatic speech recognition. For example, an automatic speech recognition process may mistake a spoken word 'speech' for the word 'beach'. In such a case, a query for 'beach' would yield an inaccurate result. Therefore, a rich media time segment containing results with higher confidence scores can be more relevant than a rich media time segment containing results with lower confidence scores.

The relevance can also be influenced by the number search results sets in which the rich media time segment appears. Content types can include textual metadata content, visual content, and audio content. Rich media time segments containing results from more content types (modalities) can be given a higher relevance than those containing results from fewer content types. For example, a rich media time segment A which appears in a textual metadata content search results set, an audio content search results set, and a visual content search results set may be given more weight than a rich media time segment B which only appears in one or two search results sets. As another example, a rich media time segment C may appear only within a visual content search results set based on text within a screen capture of an email application that was being described during rich media time segment C. The text within the captured email may be entirely irrelevant to rich media time segment C such that rich media time segment C is not actually relevant to the search query. However, if rich media time segment C also appears in an audio content search results set, it is much more likely that rich media time segment C is actually relevant to the search query. Irrelevant presentations can also end up in search results sets based on words that are misrecognized by the ASR algorithm, words which are improperly recognized during an OCR process, etc.

The relevance can also be influenced by the relevance of a content type of search results in which the rich media time segment appears. For example, a textual metadata content search result obtained from the title of a rich media presentation may be a more relevant type because it applies to the entire time duration of the rich media presentation and/or it is know to generally known to have more relevant information than another content type. Other types, such as an audio content search result, can correspond to just a small portion of the rich media presentation, and therefore may be inherently less relevant to the rich media presentation as a whole.

The relevance can also be influenced by the reliability of a content type of search results in which the rich media time segment appears. The reliability of a content type can be determined experimentally based on accumulated search results data. As an example, an individual textual metadata content search result can be more reliable than an individual audio content search result because textual metadata content search results, in general, are more likely to be accurate than audio content search results. In another exemplary embodiment, individual textual metadata content search results which include text that was hand-entered by a human can be more reliable than textual content search results derived from a fully automatic text extraction process (e.g. OCR or other automatic analysis process) because the latter is more likely to contain errors.

The relevance can also be influenced by the temporal proximity within the rich media time segment of the individual search results. Temporal proximity can be examined within each individual set of search results and/or across a plurality of search result sets (audio, visual content types). In an exemplary embodiment, a time segment which has a plurality of temporally proximate search results can be more relevant than a similar time segment in which the search results are temporally spaced farther apart. Temporally proximate (also referred to as clusters) of search results can receive a higher ranking because a cluster can allow the user to potentially find what he/she is looking for without having to play back a large portion of the rich media presentation. Further, there is an increased likelihood that a cluster of search results is relevant to the search query.

As an example, time segment F can be an individual audio content search result with fifteen valid sequences, all with a score of ninety, and all within two minutes of one another. Time segment G can be an individual audio content search result with fifteen valid sequences, all with a score of ninety, but equidistantly spaced throughout two hours of time segment G. In an exemplary embodiment, time segment F can receive more weight than time segment G within the audio content search results set because the valid sequences in time segment F are more clustered than in time segment G.

Temporal proximity can be examined within each individual set of search results and across every set of search results (audio, visual content types). For example, a ten minute time segment F can have fifteen audio content search results within two minutes of one another, and can also have fifteen of visual content search results which occur within the same two minute time period within the ten minute time segment. A ten minute time segment H can have fifteen audio content search results within two minutes of one another, and can also have fifteen of visual content search results which occur within a different two minute time period within the time segment. Time segment F can be more relevant than time segment H because of the closer temporal proximity of results in segment F.

The relevance can also be influenced by user feedback. User feedback can be information provided by a user regarding a rich media time segment or individual search results. The provided information be structure where user's are prompted to directly answer a question like "Was this time segment relevant?", or a question like "Rate the relevance of this time segment on a scale from 1 to 10". Alternatively, the provided information may be somewhat unstructured wherein the user writes a comment related to the time segment's relevance. User feedback can also be information obtained in an more automatic way—by tracking the user's interaction with provided sets of search results, by obtaining statistics regarding which rich media time segments are most commonly viewed or experienced, or by any other method known to those of skill in the art. For example, a rich media time segment which is often experienced in response to a particular search query can be more relevant than a time segment that is less often experienced in response to the same query.

The relevance can also be influenced by a contextual analysis operation. For example, a contextual analysis operation can be used to evaluate the relevancy of audio, visual, or textual metadata content, individually or in combination, which surrounds a given search result or set of search results within a time segment. If the contextual analysis indicates that the surrounding material is relevant to the search query, the rich media time segment can be more relevant. Contextual analysis can help in cases where individual search results include a passing reference to the search query. For example, time segment A may include the name 'BILL GATES' on a slide which lists the world's wealthiest men. Time segment B may include the name 'BILL GATES' on a slide full of biographical information regarding Bill Gates such as city of birth, date of birth, education, company association, etc. Time segment B can be more relevant than time segment A because time segment B contains surrounding information that is more relevant to search query.

There can be several ways to choose how much surrounding content should be used in the contextual analysis. One way is to select all of the content associated with one or more of the content types (audio, visual, textual metadata) associated the rich media time segment. For example, for a time segment containing a visual content search result from a slide, all of the content from any other slides that were displayed can be used. Another way is to select a subset of surrounding content that is in temporal proximity to one or more of the individual content search results, which could include content from multiple content types (audio, visual, and textual metadata). For example, for a time segment containing a visual content search result from a slide, just the content found on the same slide can be used in the contextual analysis.

The contextual analysis operation can utilize a lexical database that contains semantic relations among words in a language. Such a lexical database can be used in conjunction with a semantic similarity measure. A semantic similarity measure attempts to estimate how close in meaning a pair of words (or groups of words) are in meaning. A semantic similarity measure can be specific to the structure of the chosen lexical database. For example, a class-based approach has been proposed for use with the WordNet lexical database that was created at Princeton University. Other semantic similarity measures are known to those with skill in the art. Additionally, a contextual analysis operation can include natural language processing techniques for part-of-speech disambiguation and finding the most appropriate sense/meaning for every word in a given set of text. This is important for a semantic similarity measure calculation, since the meanings of words can vary significantly depending on how they are used within a sentence or fragment.

In an exemplary embodiment, a relevance score can be determined for a rich media time segment using a power series mean function, and can be based on individual search result scores within each search results set. An exemplary power series mean function is illustrated with reference to Equation 7 below, in which P is a power parameter, $a_k$ is an individual search result score (match score or confidence score) within a $k^{th}$ search results set, n is the total number of possible search results sets, and $M_P$ is the overall score for a rich media time segment. In an exemplary embodiment, the total number of possible search results sets (n) can be three, and can correspond to an audio content search results set, a visual content search results set, and a textual metadata content search results set. The power parameter P can be an affinely extended real number which can be varied to lessen or increase the impact of the highest individual search result score for a given individual search result.

$$M_P(a_1, a_2, \ldots, a_n) \equiv \left[\frac{1}{n}\sum_{k=1}^{n} a_k^P\right]^{1/P} \quad \text{Equation 7}$$

As an example, a rich media time segment A can have a score of 100 in a textual metadata content search results set, a score of 90 in a visual content search results set, and a score of 80 in an audio content search results set. As such, n=3, $a_1$=100, $a_2$=90, and $a_3$=80. With a value of P=1, an overall time segment score for rich media time segment A can be $((100^1+90^1+80^1)/3)^{1/1}=90$. With P=1, the overall time segment score is simply an average of the individual scores of rich media time segment A. For a value of P=5, an overall time segment score for rich media time segment A can be $((100^5+90^5+80^5)/3)^{1/5}=91.4$. For a value of P=20, an overall time segment score for rich media time segment A can be $((100^{20}+90^{20}+80^{20})/3)^{1/20}=95.3$.

It can be seen that as P is increased, the time segment relevance score becomes more biased toward the highest score in the time segment. Biasing the overall relevance score toward the highest score can be advantageous in cases where any of the individual match or confidence scores from a search results set do not accurately reflect relevance. For example, an individual score of 100 for a search result in a first search results set may represent a perfect match of the search query 'heart attack,' and a score of 50 for the search result in a second search results set may represent a match (based on a percentage of words found) of only the word 'attack.' The word 'attack' used alone has a significantly different meaning than the word 'attack' as used in the phrase 'heart attack.' Thus, a time segment containing a single result with a match score of 100 may be more relevant than a time segment containing ten results with a match score of 50. As such, it may be desirable to have the relevance score of the rich media time segment biased toward the highest individual score.

In an alternative embodiment, the fusion algorithm can use a voting method such as a Borda Count to determine the relative relevancies of a set of rich media time segments. In the Borda Count, result ranking information (and not scoring information) is utilized. If the received sets of search results are not all the same size, a truncated ballot form of the Borda Count can be used. In the truncated ballot form of the Borda Count, the search results set with the most individual search results can dictate the number of Borda Count points assigned to individual search results within each set. The lowest ranked individual search result in the search results set with the most individual search results can receive one Borda Count point, the second lowest ranked individual search result in the largest search results set can receive two Borda Count points, and the third lowest ranked individual search result can receive three Borda Count points. This process can be continued such that the highest ranked individual search result in the largest search results set can receive j Borda Count points, where j can be the number of individual search results in the largest search results set. The highest ranked individual search result in each of the other search results sets can also receive j Borda Count points, the second highest ranked individual search result in each of the other search results sets can receive j−1 Borda Count points, the third highest ranked individual search results can receive j−2 Borda Count points, and so on until each individual search result in each set has been assigned Borda Count points. FIGS. 12A-12C are tables illustrating the truncated ballot form of the Borda Count in accordance with an exemplary embodiment.

FIG. 12A is a table illustrating the Borda Count points assigned to a ranked audio content search results set in accordance with an exemplary embodiment. FIG. 12B is a table illustrating the Borda Count points assigned to a ranked visual content search results set in accordance with an exemplary embodiment. FIG. 12C is a table illustrating the Borda Count points assigned to a ranked textual metadata content search results set in accordance with an exemplary embodiment. Each of the tables in FIGS. 12A-12C includes the ranking of each search result within its set, an identification of the time segment (or individual search result), and the number of Borda Count points assigned to each time segment. Because the textual metadata content search results set has the most individual search results (five), the Borda Count points are dictated by the textual metadata content search results set. In an alternative embodiment, each of the search result sets can have the same number of search results, and a standard Borda Count can be used.

In one embodiment, the Borda Count points for each time segment can be added together to create the ranked list of final search results. Using the values illustrated with reference to FIGS. 12A-12C, time segment A has (five+one) six total Borda Count points, time segment B has (three+five+four) twelve total Borda Count points, time segment C has (four+three) seven total Borda Count points, time segment D has (four+five) nine total Borda Count points, and time segment E has two total Borda Count points. Using these values, a ranked set of final of search results can be time segment B, time segment D, time segment C, time segment A, and time segment E. In an alternative embodiment, quality and/or confidence scores associated with individual search results and/or search results within individual search results can be used in conjunction with the Borda Count points assigned to each individual search result. For example, an individual audio content search result which includes a valid sequence with a confidence score of one hundred may receive more Borda Count points than a similarly ranked visual content search result in which all of the visual content search results have quality scores below thirty.

In one embodiment, a relevance string based at least in part on match or confidence scores assigned to individual search results can be generated for each rich media time segment. The relevance string can be similar to the relevance string described with reference to FIG. 6. FIGS. 13A-13C are tables illustrating received search results sets and scores associated with valid sequences within each individual content search result.

FIG. 13A is a table illustrating an audio content search results set along with confidence scores for the valid sequences within each individual audio content search result in accordance with an exemplary embodiment. FIG. 13B is a table illustrating a visual content search results set along with quality scores of visual content search results within each individual visual content search result in accordance with an exemplary embodiment. FIG. 13C is a table illustrating a textual content search results set along with quality scores of textual metadata content search results within each individual textual metadata content search result in accordance with an exemplary embodiment. Thus, in the audio content search results set, time segment A has twenty-five valid sequences with a confidence score of ninety-nine and two valid sequences with a confidence score of thirty. Similarly, in the visual content search results set, time segment B has twenty visual content search results with a quality score of one hundred and five visual content search results a quality score fifty.

In one exemplary embodiment, a relevance string for a time segment can be a string which includes the highest score of any result within the presentation followed by the number of occurrences of that result, followed by the second highest score of any result within the time segment followed by the number of occurrences of that result, and so on. Thus, a relevance string for time segment A can be 099,025,030,002, 000,000,000,000,000,000,000,000, a relevance string for time segment B can be 100,040,099,001,075,012,050,011, 000,000,000,000, a relevance string for time segment C can be 100,020,099,003,075,012,060,007,050,003,020,004, a relevance string for time segment D can be 100,040,000,000, 000,000,000,000,000,000,000,000, and a relevance string for time segment E can be 100,002,000,000,000,000,000,000, 000,000,000,000. Based on a comparison of the numerical value of the relevance strings, the determined order of relevance can be time segment B, time segment D, time segment C, time segment E, time segment A.

In an exemplary embodiment, a single relevance score can be determined for a rich media time segment by summing individual search result match or confidence scores contained in each rich media time segment. Using the tables in FIGS. 13A-13C, the sum of the scores of time segment A can be $(25*99)+(2*30)=2535$. The sum of the scores of time segment B can be $(1*99)+(20*100)+(5*50)+(20*100)+(12*75)+(6*50)=5549$. The sum of the scores of time segment C can be $(3*99)+(7*60)+(4*20)+(20*100)+(12*75)+(3*50)=3847$. The sum of the scores of time segment D can be $(10*100)+(30*100)=4000$. The sum of the scores of time segment E can be $(2*100)=200$. Thus, the ranked list of final search results can be time segment B, time segment D, time segment C, time segment A, time segment E.

In an operation 1115, the search results fusion engine creates a set of final search results based on the determined relevance of time segments containing individual search results. Final search results can be comprised of an identifier of a rich media presentation, a start playback time, and an end playback time. Final search results can further contain any or all of the individual search results contained in the time segment corresponding to the final result. Including individual search results can allow a user examine the individual results within a rich media time segment.

In an operation 1120, the set of final search results is provided to the user. Final search results may be provided to the user in a way that allows multiple levels of interaction and navigation. For example, a user may first select the top-ranked (most relevant) time segment, and then may examine the individual content results contained in that time segment. Alternatively, a user may choose to navigate to different playback times of the time segment independent of whether those playback times correspond to an individual result. For instance, once a time segment is selected by a user, a viewer application may allow the user to jog throughout the time segment using a timeline-based slider control. In one embodiment, the number of search results in the set of final search results can be limited to a predetermined or user-defined value such that only the best search results are presented. Alternatively, the number of search results in the set of final search results from any one search results set may be limited. For example, the set of final search results may include no more than twenty audio content search results, no more than twenty visual content search results, and no more than ten textual metadata content search results. Alternatively, the ranked list of final search results can include any other number and/or combination of individual search results, including every single individual search result from each of the received sets of search results.

Several flow diagrams have been used to describe exemplary embodiments. The use of flow diagrams is not meant to be limiting with respect to the order of operations performed. Further, the foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of generating an audio content index for use by a search engine, the method comprising:
    (a) determining, with a processor of an audio content search system, a phoneme sequence based on recognized speech from an audio content time segment;
    (b) identifying, with the processor, k-phonemes which occur within the phoneme sequence;
    (c) storing, in a memory of the audio content search system, the identified k-phonemes within a data structure such that the identified k-phonemes are capable of being compared with k-phonemes from a search query;
    (d) including the audio content time segment in an ordered audio content search results set, wherein an order of the audio content time segment is based at least in part on a confidence score of a valid sequence within the audio content time segment; and
    (e) providing the ordered audio content search results set to a multi-modal search results fusion engine.

2. The method of claim 1, wherein determining the phoneme sequence comprises looking up words in the recognized speech in a phonetic pronunciation dictionary.

3. The method of claim 1, wherein the identified k-phonemes comprise at least one of phonemes, bi-phonemes, tri-phonemes, quad-phonemes, and penta-phonemes.

4. The method of claim 1, wherein the identified k-phonemes and the k-phonemes from the search query comprise tri-phonemes.

5. The method of claim 1, wherein the identified k-phonemes comprise order independent k-phonemes.

6. The method of claim 1, wherein the identified k-phonemes comprise order dependent k-phonemes.

7. The method of claim 1, wherein the data structure comprises a multi-array lookup table.

8. The method of claim 7, wherein an array in the multi-array lookup table comprises entries of a plurality of distinct audio content time segments.

9. The method of claim 7, wherein an array in the multi-array lookup table comprises a mapped sequence of the identified k-phonemes.

10. The method of claim 7, wherein an array in the multi-array lookup table comprises starting locations within the phoneme sequence of the identified k-phonemes.

11. The method of claim 1, further comprising using an ordinal function to sequentially map the k-phonemes into the data structure.

12. The method of claim 1, further comprising recognizing the recognized speech with an automatic speech recognition algorithm.

13. The method of claim 1, further comprising storing timestamps corresponding to the identified k-phonemes in the data structure.

14. A method of locating information within an audio content time segment comprising:
    (a) identifying, with a processor of an audio content search system, k-phonemes of a search query based on a phonetic pronunciation of the search query;
    (b) identifying, with the processor, k-phonemes within an audio content index which match the identified k-phonemes of the search query to determine an audio content index starting location, wherein the audio content index comprises phoneme data associated with an audio content time segment;
    (c) performing, with the processor, a comparison of the phonetic pronunciation to the phoneme data at the audio content index starting location to identify an audio content search result;

(d) including the audio content time segment in an ordered audio content search results set, wherein an order of the audio content time segment is based at least in part on a confidence score of a valid sequence within the audio content time segment; and (e) providing the ordered audio content search results set to a multi-modal search results fusion engine.

15. The method of claim 14, further comprising receiving the search query.

16. The method of claim 14, further comprising determining the phonetic pronunciation of the search query.

17. The method of claim 16, wherein the phonetic pronunciation of the search query is determined using a phonetic pronunciation dictionary.

18. The method of claim 16, wherein the phonetic pronunciation of the search query is determined using a rules-based guessing algorithm.

19. The method of claim 16, wherein the phonetic pronunciation of the search query is determined using a phonetic pronunciation dictionary and a rules-based guessing algorithm.

20. The method of claim 14, wherein the comparison is scored based on at least one of an insertion, a substitution, and a deletion identified by a phoneme matching algorithm used to implement the comparison.

21. The method of claim 14, further comprising generating a phonetic lattice based on the phonetic pronunciation of the search query.

22. The method of claim 21, wherein the phonetic lattice comprises a compressed phonetic graph.

23. The method of claim 14, further comprising identifying bi-phonemes of the search query.

24. The method of claim 23, wherein identifying the k-phonemes within the audio content index comprises:

comparing the identified bi-phonemes of the search query to the audio content index to identify one or more matching bi-phonemes such that one or more initial starting locations are identified; and comparing the identified k-phonemes of the search query to the audio content index at the one or more initial starting locations to identify matching k-phonemes within the audio content index.

25. The method of claim 14, wherein the identified k-phonemes within the audio content index and the identified k-phonemes of the search query comprise at least one of bi-phonemes, tri-phonemes, quad-phonemes, and penta-phonemes.

26. The method of claim 14, wherein the comparison of the phonetic pronunciation to the phoneme data comprises a phoneme comparison in a forward direction from the audio content index starting location and a phoneme comparison in a backward direction from the audio content index starting location.

27. The method of claim 14, wherein the comparison of the phonetic pronunciation to the phoneme data comprises at least one of a phoneme comparison in a forward direction from the audio content index starting location and a phoneme comparison in a backward direction from the audio content index starting location.

28. The method of claim 14, wherein the comparison comprises a depth first comparison such that a first comparison at a first audio content index starting location is completed prior to commencing a second comparison at a second audio content index starting location.

29. The method of claim 14, wherein the comparison comprises a heuristic comparison based on a comparison relevance such that a comparison with a higher comparison relevance is implemented prior to a comparison with a lower comparison relevance, wherein the comparison relevance is determined by a phoneme matching algorithm.

30. The method of claim 14, further comprising assigning a score to the audio content search result based on a quality of the comparison.

31. The method of claim 30, wherein the score is based at least in part on whether the comparison comprises an exact match, an insertion, a substitution, or a deletion.

32. The method of claim 30, wherein the comparison at the audio content starting location is terminated if the score exceeds a predetermined score threshold.

33. The method of claim 30, wherein the score comprises a first score based on a phoneme comparison in a forward direction from the audio content index starting location and a second score based on a phoneme comparison in a backward direction from the audio content index starting location.

34. The method of claim 14, further comprising performing (a)-(c) in parallel to locate audio content search results in a plurality of audio content time segments.

35. The method of claim 14, further comprising forming the valid sequence comprising one or more audio content search results from the audio content time segment.

36. The method of claim 35, wherein if the valid sequence comprises a plurality of audio content search results, the plurality of audio content search results occur in the audio content time segment within a specified time of one another.

37. The method of claim 35, wherein if the valid sequence comprises a plurality of audio content search results, the plurality of audio content search results occur in the same order as words in the search query.

38. The method of claim 35, wherein the confidence score comprises a likelihood that the valid sequence is a true occurrence of the search query.

39. The method of claim 38, wherein the confidence score is determined using a curve fitting function and an observed trend from a language corpora.

40. The method of claim 38, wherein the confidence score is based at least in part on a total penalty score assigned to the valid sequence, wherein the total penalty score is based at least in part on one or more audio content search result scores assigned to the one or more audio content search results within the valid sequence and a number of words from the search query which are missing from the valid sequence.

41. The method of claim 40, wherein the confidence score is based at least in part on a match percentage score, wherein the match percentage score comprises the total penalty score divided by a maximum possible penalty score.

42. The method of claim 38, wherein the confidence score is based at least in part on a number of words in the search query.

43. The method of claim 38, wherein the confidence score is based at least in part on a phonetic uniqueness score of the search query.

44. The method of claim 14, wherein the order of the audio content time segment is determined using a mathematical formula.

45. The method of claim 44, wherein the mathematical formula comprises a score summation formula capable of being used to sum at least one of match scores associated with the audio content time segment and confidence scores associated with the audio content time segment.

46. The method of claim 44, wherein the mathematical formula includes an exponential power factor corresponding to at least one of a match score associated with the audio content time segment and the confidence score associated with the audio content time segment.

47. The method of claim 14, wherein the order of the audio content time segment is based at least in part on a score associated with the audio content time segment and a number of individual audio content search results in the audio content time segment.

48. The method of claim 14, wherein the order of the audio content time segment in the ordered audio content search results set is based at least in part on whether the identified k-phonemes within the audio content index occur in the same order as the identified k-phonemes of the search query.

49. The method of claim 14, wherein the order of the audio content time segment in the ordered audio content search results set is based at least in part on identified k-phonemes within the audio content index which do not appear in at least a portion of the search query.

50. The method of claim 14, wherein the order of the audio content time segment is determined based on a relevance string corresponding to the audio content time segment.

51. The method of claim 50, wherein the relevance string is based at least in part on a number of conjunctive results within the audio content time segment.

52. The method of claim 50, wherein the relevance string is based at least in part on a confidence score of a valid sequence within the audio content time segment.

53. A system for locating information within an audio content time segment comprising:

(a) an audio content search application, wherein the audio content search application comprises computer code configured to identify k-phonemes of a search query based on a phonetic pronunciation of the search query;

identify k-phonemes within an audio content index which match the identified k-phonemes of the search query to determine an audio content index starting location, wherein the audio content index comprises phoneme data associated with an audio content time segment;

perform a comparison of the phonetic pronunciation to the phoneme data at the audio content index starting location to identify an audio content search result;

include the audio content time segment in an ordered audio content search results set, wherein an order of the audio content time segment is based at least in part on a confidence score of a valid sequence within the audio content time segment; and provide the ordered audio content search results set to a multi-modal search results fusion engine (b) a memory configured to store the audio content search application; and (c) a processor coupled to the memory and configured to execute the audio content search application.

\* \* \* \* \*